United States Patent
Garwood

(10) Patent No.: US 9,949,494 B2
(45) Date of Patent: Apr. 24, 2018

(54) METHOD OF SEPARATING MEAT COMPONENTS VIA CENTRIFUGE

(76) Inventor: Anthony J. M. Garwood, Mercer Island, WA (US)

(*) Notice: Subject to any disclaimer, the term of this patent is extended or adjusted under 35 U.S.C. 154(b) by 160 days.

(21) Appl. No.: 13/493,733

(22) Filed: Jun. 11, 2012

(65) Prior Publication Data

US 2013/0142928 A1 Jun. 6, 2013

Related U.S. Application Data

(63) Continuation-in-part of application No. 13/422,740, filed on Mar. 16, 2012, now abandoned, which is a continuation of application No. 11/911,338, filed as application No. PCT/US2006/014261 on Apr. 13, 2006, now Pat. No. 8,137,722, application No. 13/493,733, which is a continuation-in-part of application No. 12/697,592, filed on Feb. 1, 2010, now Pat. No. 8,568,813, which is a continuation of application No. 10/868,394, filed on Jun. 15, 2004, now Pat. No. 7,666,456, application No. 13/493,733, which is a continuation-in-part of application No. 13/452,526, filed on Apr. 20, 2012, now Pat. No. 8,911,809, which is a continuation of application No. 11/720,594, filed as application No. PCT/US2005/043507 on Dec. 2, 2005, now Pat. No. 8,178,144, which is a continuation-in-part of application No. 11/004,669, filed on Dec. 2, 2004, now abandoned.

(60) Provisional application No. 60/671,238, filed on Apr. 13, 2005, provisional application No. 60/651,128, filed on Apr. 9, 2004, provisional application No. 60/639,828, filed on Dec. 28, 2004.

(51) Int. Cl.
*A22C 17/00* (2006.01)
*A23L 13/00* (2016.01)

(52) U.S. Cl.
CPC ......... *A22C 17/0026* (2013.01); *A23L 13/00* (2016.08)

(58) Field of Classification Search
CPC .. A23C 15/14; A23D 9/02; C11B 1/10; C11B 3/10; C11B 1/12
USPC .................................................. 426/417, 480
See application file for complete search history.

(56) References Cited

U.S. PATENT DOCUMENTS

| | | |
|---|---|---|
| 3,780,191 A | 12/1973 | Langer |
| 5,147,672 A | 9/1992 | McLachlan |
| 5,221,554 A * | 6/1993 | Gamay ........................ 426/646 |
| 5,378,418 A | 1/1995 | Berger |
| 5,435,443 A | 7/1995 | Hohenester |
| 5,552,173 A | 9/1996 | Singh |
| 6,036,630 A | 3/2000 | Robey |
| 6,123,945 A | 9/2000 | Nakatsu |
| 6,172,246 B1 | 1/2001 | Franke |
| 6,224,930 B1 | 5/2001 | Inglis |
| 7,666,456 B2 | 2/2010 | Garwood |
| 8,137,722 B2 | 3/2012 | Garwood |
| 8,178,144 B2 | 5/2012 | Garwood |
| 2001/0007690 A1 | 7/2001 | Girsh |
| 2002/0134317 A1 | 9/2002 | Shane |
| 2010/0112168 A1 | 5/2010 | Garwood |
| 2011/0008505 A1 | 1/2011 | Garwood |
| 2012/0060409 A1 | 3/2012 | Garwood |

* cited by examiner

*Primary Examiner* — Vera Stulii
(74) *Attorney, Agent, or Firm* — Christensen O'Connor Johnson Kindness PLLC

(57) ABSTRACT

A method for separating fat from lean. The method includes grinding chilled beef comprising fat and lean into a size resulting in particles that comprise predominantly fat and particles that comprise predominantly lean; combining the particles with a fluid to produce a mixture, wherein the fluid comprises water; and centrifuging the mixture to separate the fluid, and the particles comprising predominantly lean from the mixture.

9 Claims, 11 Drawing Sheets

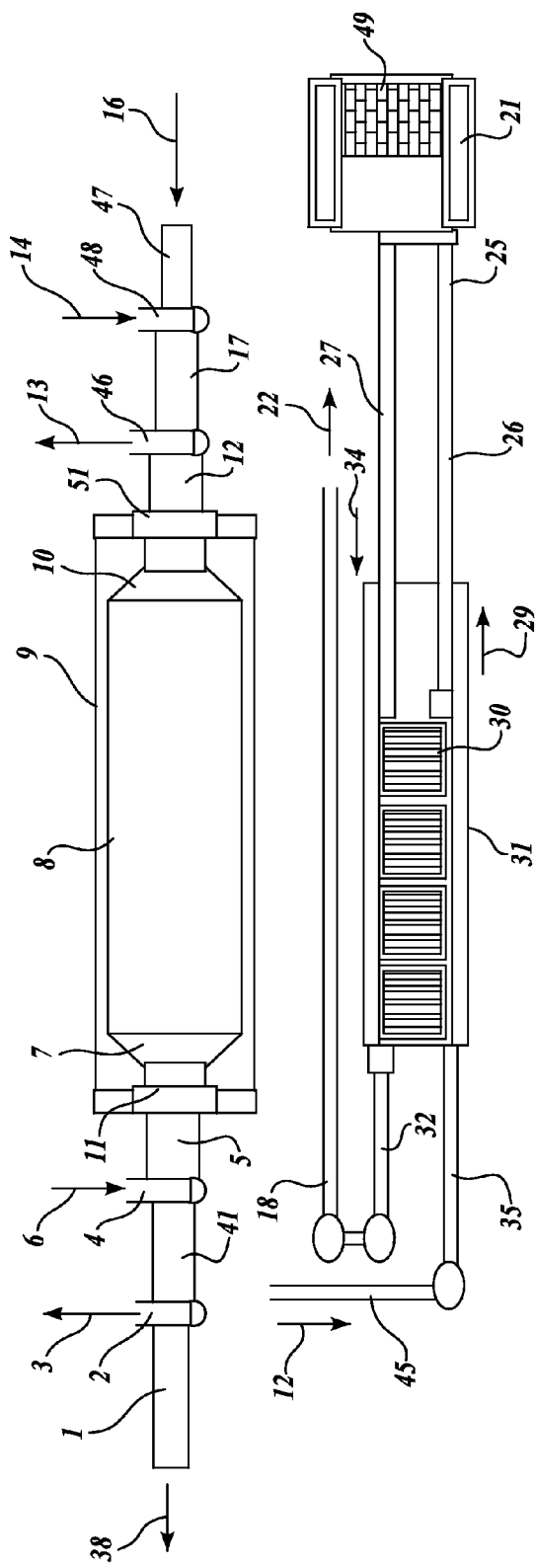
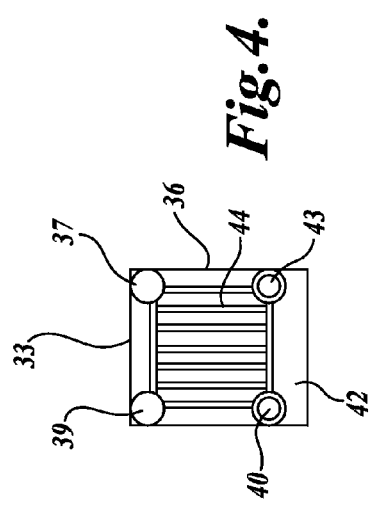
Fig.3.
Fig.4.

METHOD OF SEPARATING MEAT COMPONENTS VIA CENTRIFUGE

CROSS-REFERENCES TO RELATED APPLICATIONS

This application is a continuation-in-part of U.S. patent application Ser. No. 13/422,740, filed Mar. 16, 2012, which is a continuation of U.S. patent application Ser. No. 11/911,338, filed Oct. 9, 2008 (now U.S. Pat. No. 8,137,722), which is the national phase of International Application No. PCT/US2006/014261, filed Apr. 13, 2006, which claims the benefit of U.S. Provisional Application No. 60/671,238, filed Apr. 13, 2005.

This application is a continuation-in-part of U.S. patent application Ser. No. 12/697,592, filed Feb. 1, 2010, which is a continuation of U.S. patent application Ser. No. 10/868,394, filed Jun. 15, 2004 (now U.S. Pat. No. 7,666,456), which claims the benefit of U.S. Provisional Application No. 60/561,128, filed Apr. 9, 2004.

This application is a continuation-in-part of U.S. patent application Ser. No. 13/452,526, filed Apr. 20, 2012, which is a continuation of U.S. patent application Ser. No. 11/720,594, filed Apr. 30, 2009 (now U.S. Pat. No. 8,178,144), which is the national phase of International Application No. PCT/US2005/043507, filed Dec. 2, 2005, which claims the benefit of U.S. patent application Ser. No. 11/004,669, filed Dec. 2, 2004, and U.S. Provisional Application No. 60/639,828, filed Dec. 28, 2004. All applications are incorporated herein expressly by reference.

BACKGROUND

In the process of boning a carcass, the external fat layer is removed. During this process, a significant amount of lean can be cut from the carcass and discarded with the fat. This process leads to a significant loss of lean. To recover the lean, the discarded fat was heated and processed in a centrifuge to separate the fat from the lean. The lean was then frozen and chipped into small flakes. The finished product, known as Lean Finely Textured Beef (hereinafter "LFTB") could later be added to ground beef, for example.

SUMMARY

A "Decanter Style" centrifuge has a horizontally disposed tubular shaped rotating "bowl" with a cone-shaped section enclosing each end of the tube shaped "bowl" at each end. An inner and an outer screw are mounted centrally, in horizontal disposition within the "bowl." The inner screw transfers material towards one of the cone-shaped sections that leads to an outlet of the centrifuge. A mixture of temperature controlled ground meat (for example beef), temperature controlled liquid phase and gaseous phase and/or vapor phase carbon dioxide, gas, and water, is loaded into and then spun within the centrifuge. The higher density components, such as lean (muscle), may accumulate against the inner surface of the spinning "bowl," away from the central axis of bowl rotation and is then transferred by the outer screw towards a cone-shaped section. The lower density components, such as fat and fatty adipose tissue, accumulate toward the center of rotation, and are transferred toward an outlet via the inner screw. Gaseous phase carbon dioxide accumulates in the center of centrifuge, closest to the axis of rotation and in proximity of the cone-shaped section. The lean and fat are transferred out through narrow conduits, while the gas stratum displaces liquid carbon dioxide from the conduits through which they are removed, which can substantially reduce the loss of any liquid carbon dioxide. The centrifuge is pressurized at a pressure, such as about 550 psig, which can maintain carbon dioxide as a liquid at about 34 degrees F. Additionally, pressurized and temperature controlled carbon dioxide with water forms carbonic acid, which can kill bacteria and pathogens.

Embodiments include, but, are not limited to the following. Any one, more than one, or all of the features can be combined.

A method for separating fat from lean includes, grinding chilled beef comprising fat and lean into a size resulting in particles that comprise predominantly fat and particles that comprise predominantly lean; combining the particles with a fluid to produce a mixture, wherein the fluid comprises water; and centrifuging the mixture to separate the fluid, and the particles comprising predominantly lean from the mixture.

The method may further include collecting the fluid, and introducing the collected fluid into the mixture prior to centrifuging. The fluid may include an acid. The acid may be carbonic acid. The fluid comprises chlorine dioxide. The particle size may be in a range of 1/16 to 1/4. The method may further include separating the particles comprising predominantly fat. The beef may be chilled prior to grinding.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a diagrammatical illustration of a centrifuge and heat exchanger assembly for the separation of fat and lean, and recirculation of fluid;

FIG. 4 is diagrammatical illustration of a heat exchanger;

DETAILED DESCRIPTION

Disclosed are methods for the separation of fat from a mixture of ground beef and a fluid.

Figure 1:
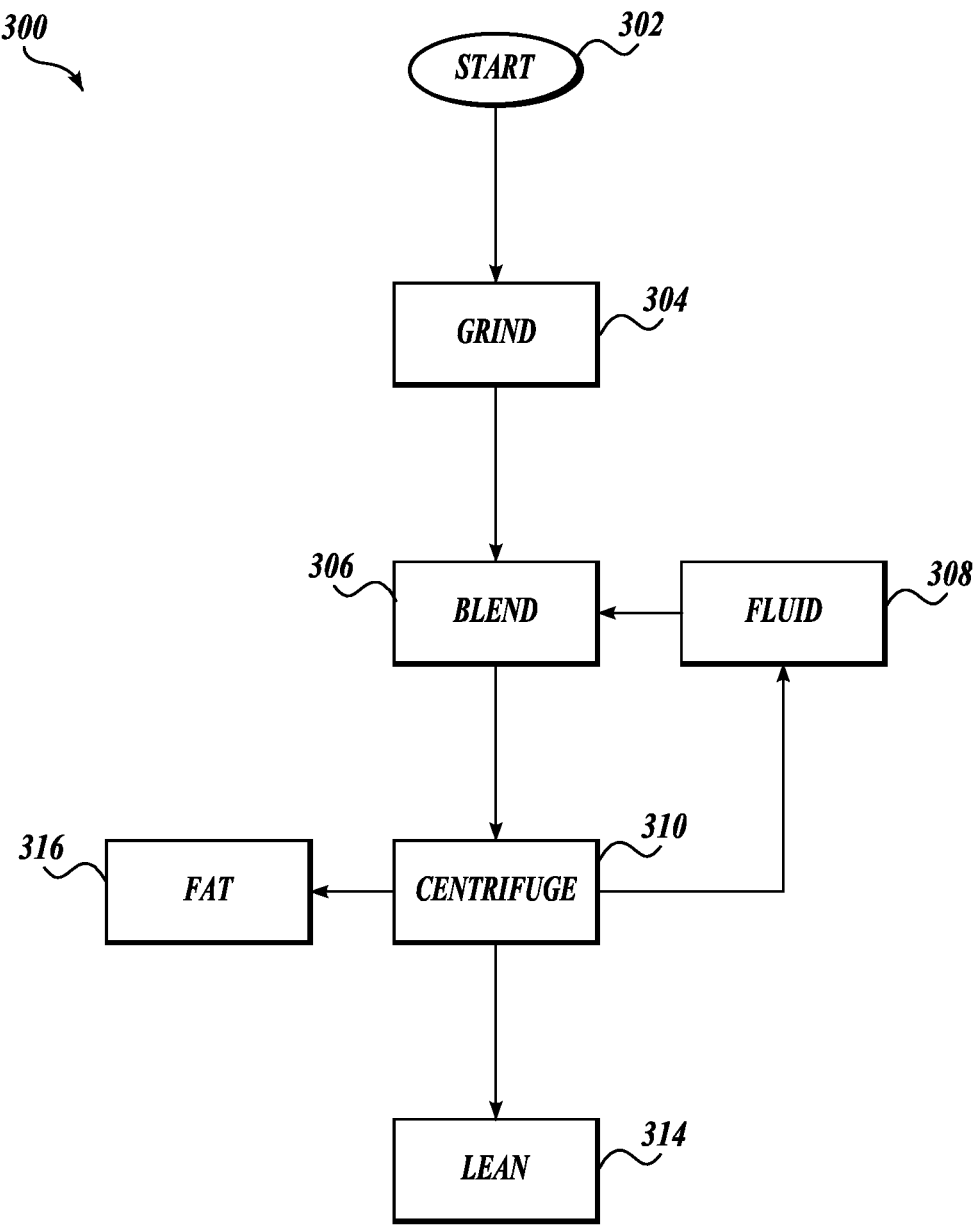
FIG. 1 is a schematic flow diagram of a method for the separation of fat and lean.

Referring to FIG. 1, a method for the separation of fat includes the grinding of beef, block 304. While beef is mentioned to illustrate embodiments of the methods, it is to be appreciated that the methods can be used with any other foodstuff, and meats, such as poultry, fish, or pork. For example, boneless beef having some fat and some lean can be used. In some embodiments, the source of boneless beef can comprise one or a combination of what is commonly known in the industry as 50's and 65's boneless beef, and even 30's (XF's) or any other suitable boneless beef. The source beef can be the trim that is leftover after a carcass has been broken down into primals. In some embodiment, boneless beef may incidentally include bone and cartilage.

During grinding, the grinding process is carried out to produce a grind size that is small enough such that the grind particles that result from grinding are predominantly lean or predominantly fat. However, proportions of fat and lean in any individual particle may vary from particle to particle. It is to be appreciated that the use of the terms "lean" and "fat" are generalized in the sense that "lean" may contain some fat, but the lean is the predominant component. Similarly, the term "fat" is generalized to mean material wherein fat is the predominant component, but it may include some lean. "Fat particles" refer to the particles that are predominantly fat, and "lean particles" refer to particles that are predominantly lean. Predominantly includes at least a majority or greater than 50% by weight or by volume, for example. An average particle size of 1/16" to 1/4" can be advantageous. Grind particles of a size less than 1/16" or greater than 1/4" can be disadvantageous because it is believed that the particles may have about the same amount of fat and lean, making separation of fat, and production of a lean beef product more difficult. Further, because centrifugation relies on the separation of materials having different densities, particles of beef that have similar densities because they have similar amounts of fat and lean can also make the separation process more difficult. To produce grind particles within the specified size range, in some embodiments, the size of the cutting plate holes can be about 1/16" to 3/8", and 1/16" to 1/4". Further, it can be easier to grind particles, when the beef is chilled to a temperature that renders the beef of a hard, but not frozen consistency.

After grinding, the particles are blended with a fluid, block 306. The fluid can include water. The fluid allows the separation of particles in a centrifuge. Fluids for use in the methods to separate relatively light particles comprising predominantly fat from heavy particles comprising predominantly lean may include water, and/or liquefied gas or a blend of liquefied or vaporized gases including carbon dioxide and/or any atmospheric gas(es), including carbon monoxide, ammonia or any other gas, with water. Additionally, the fluid may comprise water or processing aids including sodium citrate, sodium chlorite, tri-sodium phosphate, chorine dioxide, and sodium chloride and any combination thereof, which may be dissolved in water (or carried as a suspension therein), and that can be mixed with any liquefied or vaporized gas or gases. Fluids can be controlled at a selected pressure and/or temperature to lower or raise the density of the fluid to assist with the separation of the relative light predominantly fat particles from the relative heavy predominantly lean particles. In most cases, for example, material comprising predominantly fat may separate from material comprising predominantly lean. The separation point, and therefore the content of fat is adjustable according to the demands of customers either wishing extremely pure lean beef or beef where more than the majority is fat, or any fat percentage between the extremes, and the density of the fluid can be adjusted by controlling the temperature and/or pressure. The blending of fluid with the particles can occur in any vessel, such as a vessel connected to the grinder. The vessel may include a rotating agitator, such as paddles, and the like. After blending, a mixture of fluid with particles that are predominantly fat and particles that are predominantly lean can be transferred to the centrifuge, block 310.

Centrifuges separate according to the density of the materials. The higher density particles may be flung out farther by centrifugal force than the less dense particles. The more dense particles, being predominantly lean, can thusly be separated by accumulation against the inner side of the outermost wall of the centrifuge. Lower density particles, being predominantly fat, accumulate in a substantially central location of the centrifuge. The fluid having a density between that of the lean particles and the fat particles may accumulate in an intermediate zone between the accumulated lean particles and the accumulated fat particles. As the particles are processed in the centrifuge, lean, fat, and the fluid can be extracted in respective conduits from the centrifuge.

The separated lean, block 314, and the separated fat, block 316 can be separate products. The separated fluid, block 308, can be recycled, and combined with the recently ground particles in block 306. The recycled fluid can be sanitized or disinfected to deactivate it of pathogens, for example, by pasteurizing, and/or by irradiation with UVc light, prior to combining with the ground particles. Fluid can be added to make-up for any loss of fluid.

The separated lean and fat can be directed into separate storage vessels and the fat may be retained in steel tanks until required for further processing or used to manufacture other products. The lean can be sold for incorporation into other beef products, or alternatively, the lean can be combined with an amount of the fat to produce a ground beef product of a predetermined fat content. Alternatively, the centrifuge can be operated so that less of the fat is separated, and is carried into the lean. For example, the speed of the centrifuge can be adjusted to produce a beef product of a predetermined fat content.

The amount of fluid may be a multiple of the particle flowrate, and can be about one-half to about four times the flow rate of the particles. The amount of added fluid can be about 3 to about 5 times the weight of the particles.

Figure 2:
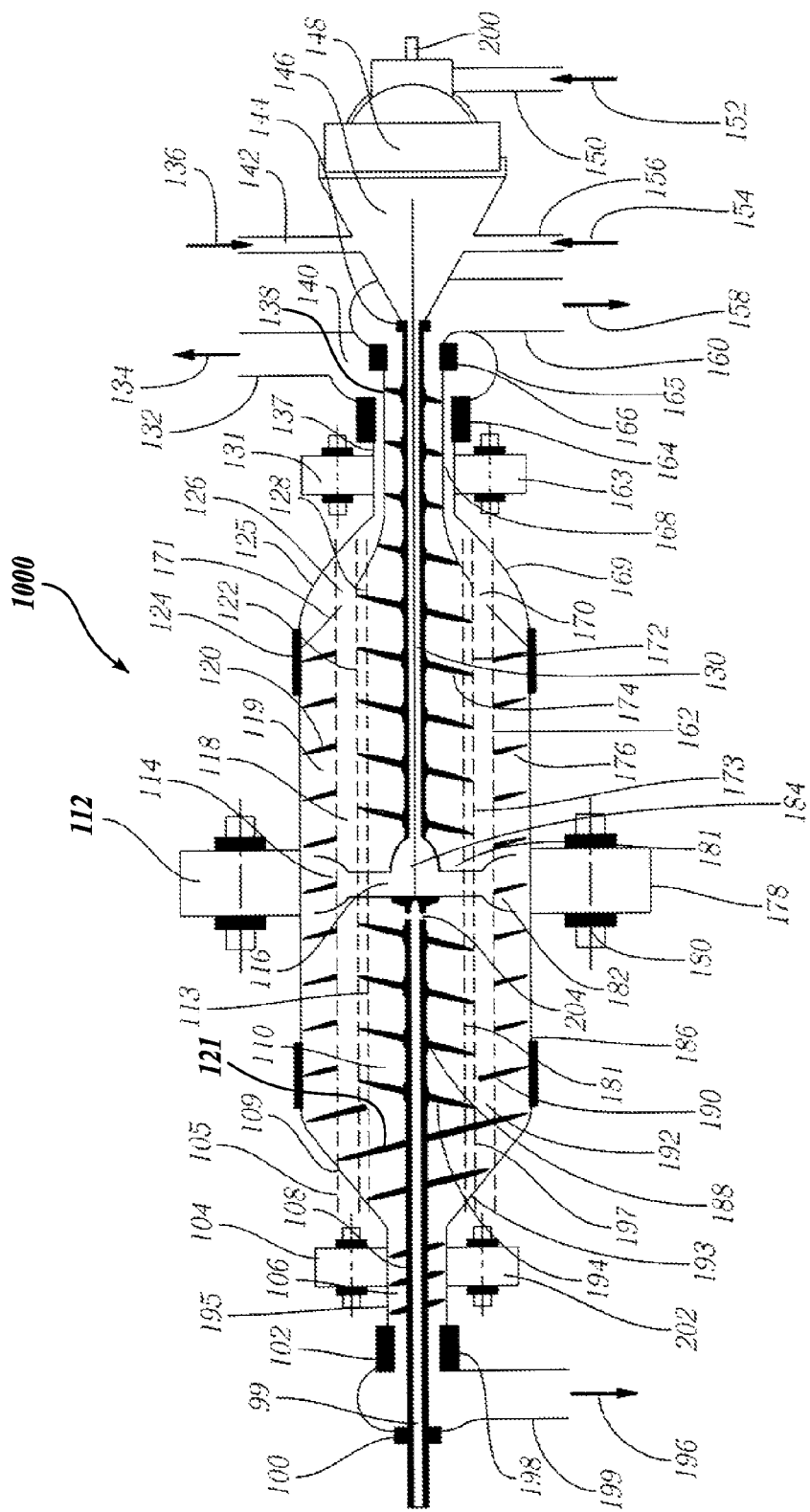
FIG. 2 is a diagrammatical illustration of a centrifuge for the separation of fat and lean.

FIG. 2 is a diagrammatic representation of a cross section through a centrifuge 1000, and grinder 148. The centrifuge 1000 includes a housing 186 (the "bowl"). The housing 186 is generally horizontally disposed and cylindrical in shape with cone-shaped sections enclosing a space therein. The housing 186 comprises a cylindrical shaped "bowl" with a first cone-shaped section 109 at one end of the housing 186. A second cone-shaped section 125 is located at a second and opposite end of the "bowl". The cone-shaped section 109 tapers down in diameter from that of the housing 186 to a smaller diameter defining a cylindrical conduit section 195. Section 195 leads to a manifold, which is ultimately connected to outlet 199. Similarly, the cone shaped section 125 tapers down in diameter from that of the housing 186 to a smaller diameter defining a cylindrical conduit section 137. Section 137 leads to a manifold section 165, which is connected to the outlet 132. The cone-shaped section 125 has an inwardly facing beech face at 171 within the interior thereof. The beech face at 171 encloses an annular space created between the beech face 171 wall and the outer vessel wall at 125.

The annular space communicates directly with annular space 168 enclosed within conduit section 138, which connects directly with manifold 165 and then to outlet 132.

The beech face 171 has ports 126, 170 that allow fluid material comprising substantially liquid phase carbon dioxide to be removed from the centrifuge 1000 via the outlet 132. The cone-shaped section 109 is in close and near contacting relationship with an outer screw. The cone profiled beech face 171 is in close and near contacting relationship with inner screw 174. The inner beech face of cone-shaped section 109 is provided to enable extraction of matter such as lean, that accumulates against the inner face of cylindrical housing 186 by the rotating action of outer screw 120, whereas beech face at 171 is provided to enable the extraction of matter, such as beef fat, after accumulation within the space defined by broken lines 122 and 128, through the conduit 138, and discharged from outlet 160.

It can be seen that the centrifuge sections 195, 109, 186, 125, and 137, are connected together to provide a single pressure vessel, which is configured to rotate as a single enclosed sealed and pressurized unit. Bearings support the pressure vessel 1000, which enable the unrestricted rotation thereof. The pressure vessel 1000 is supported by bearings 100, 102, 198, 138, and 164, and bearings at 166 and 144. All bearings are sealed to prevent escape of carbon dioxide gas or other fluids. The centrifuge assembly 1000 is driven by surface drive wheels 104 and 202, and drive wheels 131 and 163. Drive wheels 112 and 178 are disposed at about the middle of the centrifuge 1000. Drive wheels rotate the centrifuge at approximately 500 rpm. The centrifuge 1000 includes a central shaft 108, which is supported by bearings 100 and 144 at respective ends thereof that permit shaft 108 to rotate. Bearings 100 and 144 also seal the central shaft 108 against gas or liquid seepage.

The shaft 108 can have a hollow core providing a conduit 99 through the center of the shaft 108. The shaft 108, therefore, provides an inlet for a gas to be injected within the interior of the centrifuge 1000. For example, any gas, including carbon dioxide, carbon monoxide, any noble gas, or gas combinations, can be injected through the hollow core 99 of the shaft 108. The gas exits within the centrifuge 1000 through apertures 204 disposed in the shaft 108 at about the center of the centrifuge 1000.

In one embodiment, the shaft includes spirals (Archimedes screws). However, other embodiments may include paddles, or other means for transferring material, such as conveyors, etc. The shaft 108 includes an inner spiral 174 and an outer spiral 120. The outer spiral 120 transfers matter accumulated against the interior surface of the housing 186 and transfers the matter toward the cone-shaped section 109, through the narrow cylindrical conduit 195, and is then discharged through outlet 199. The outer spiral includes the spiral section 120, which has a diameter approximately equal to the inside diameter of the housing 186. However, the individual flights in the spiral section 120 are not attached to shaft 108, but nevertheless, form a continuous spiral. The outer spiral section 120 is connected via a transition spiral section 121 at the cone-shaped section 109, which does have individual flights connected to shaft 108, but decrease in diameter in conformance with the cone-shaped section 109.

The transition spiral section 121 connects to a smaller diameter spiral section 106 in the cylindrical section 195. In this manner, it can be appreciated that material that accumulates in against the interior surface of housing 186 in zone 119 may be transferred toward the cone-shaped section 109 and is eventually discharged through the outlet 199 as indicated by the direction of arrow 196.

The inner screw or spiral includes the left spiral section 188, which is located within the outer spiral section 120. The inner spiral includes the right spiral section 174, which is also located within the outer spiral section 120. The spiral section 174 has flights that decrease in diameter in proximity to beech face 171, which transitions to even smaller diameter flights within the cylindrical section 138. In this manner, material that accumulates toward the center axis of the centrifuge 1000, such as at stratum 193, may be transferred toward the cone-shaped section 125, through narrowed conduit 138, and eventually discharged from outlet 160, as indicated by the arrow 158. In one embodiment, the inner spiral sections may have a left hand spiral, while the outer spiral sections may have a right hand spiral, or vice versa. In another embodiment, both the inner spiral and the outer spiral can have the same direction. In the latter case, the inner spiral and the outer spiral can be driven independently of one another in opposing directions, so as to cause material to be transferred in two directions. In the former embodiment, both the inner spiral and the outer spiral can be disposed on a single shaft, as illustrated. Thus, the rotation of the shaft 108 may cause material to be transferred in opposing directions by the inner spiral and the outer spiral, and out through respective outlets in accordance with whether the material is a dense material or a less dense material.

More particularly, a planetary gear arrangement can be provided so as to connect the housing 186 and shaft 108 through a planetary gear arrangement having a ratio such that the screw assembly may rotate relative to the housing 186 at a speed sufficient to transfer stratified materials from within the centrifuge at a suitable rate approximately equal to the rate of mass flow of goods transferred into the centrifuge.

The right side of the shaft 108 also has a hollow core forming the conduit 130. In the illustrated embodiment, the conduit 130 is in communication with a cone-shaped vessel 146. The vessel 146 is located downstream from a grinder plate 148. The grinder 148 is driven by a shaft 200, which is connected to a driver (not shown). The grinder 148 is fed through inlet 150, as indicated by arrow 152. A fluid, such as water and optionally, carbon dioxide, and/or chlorine dioxide, is introduced into vessel 146 via conduits 142 and 156, as indicated by arrows 136 and 154. Fluid and the ground beef combine in the cone-shaped vessel 146, which leads to the conduit 130. A gas, such as carbon dioxide, or a blend of gases with carbon dioxide can be injected into grinder 148 through ports 136 and 156. When water is combined with carbon dioxide, a pH of less than 2 may be achievable to assist in decontamination of the particles. Sodium chloride or any other salt, including sodium chlorite, may be added with the fluid. A benefit of adding a salt is to make corrections in the density of the fluid that affects how much separation may occur in the centrifuge. A benefit of adding a salt may be to make corrections in the density of the fluid that affects how much separation may occur in the centrifuge.

Gas injection before grinding advantageously displaces air that would otherwise result in increased absorption of oxygen into the material due to the increase in surface area as a result of grinding. The delivery of the particles after grinding into an environment low in oxygen is also beneficial. Oxygen can be detrimental to beef as the oxidation of fat leads to rancidity and a relatively shorter shelf life of beef. The entire process of fat separation can be performed under reduced oxygen conditions that advantageously delay the onset of rancidity.

A water jacket surrounding the grinder 148 can provide for the ability to heat and/or cool the grinder 148 and its contents. Temperatures can be adjusted in the range from about 24° F. (−4.4° C.) to about 110° F. (43.3° C.). The temperature of the grinder screw housing can be adjusted in such a way that heat transfer may adjust the temperature of the beef as it is transferred along the grinder 148. Any suitable medium, such as glycol, may be used as a heat exchange medium.

After grinding, there can be particles that are predominantly lean, and particles that are predominantly fat. The particles with the fluid travel through conduit 130 and eventually exits into the interior of the centrifuge housing 186 at a distributor 184 via the outlets 116 and 182.

Through centrifugal force created by rotation, stratification of the particles within the centrifuge 1000 is produced. The most dense components, such as heavier lean particles, may accumulate on the interior side of the housing 186, in the stratum defined by the dotted line 105. These denser particles are transferred via the outer screw 120 towards the cone-shaped section 109, through the narrowed section 195, and eventually out through the conduit 199. Generally, the component with a density below that of lean may be the fluid. The fluid may generally accumulate as a stratum defined between the dotted lines 105 and 122. Fluid may exit through the beech face 171 at the cone-shaped section 125 through apertures 126 and 170 in the beech face 171, which are at a height of the stratum defined between the dotted lines 105 and 122. The fluid passes between the beech face 171 and the outer housing through the annular space 168, defined by the outer wall of conduit 138 and the inner wall of conduit 137, eventually leaving the centrifuge 1000 through outlet conduit 132.

Conduit 132 is connected to a system for chilling the fluid, as discussed below, so as to enable recycling of the fluid. Generally, lower in density than the fluid may be the fat particles. Fat may generally accumulate in a stratum defined by the dotted lines 122 and 128. This material may be transferred via the inner screws 188, 174 towards the beech face 171, and below the apertures 126, 170 to minimize transfer out with liquid carbon dioxide, through the narrowed conduit 138, and is discharged through outlet 160.

The least dense component may generally be any gas, such as carbon dioxide, carbon monoxide, any noble gas, or combinations of gas. Such gas accumulates in a stratum defined by the dotted line 113, and may fill the volume surrounding the central axis of the centrifuge. The outer boundary 113 of the concentric stratum of gas may generally need to be kept greater than the diameters (i.e., the perimeters) of the narrowed conduit 195 and the narrowed conduit 138 in order to displace the fluid that tends to mix with the lean, as the lean passes through the stratum of the fluid in its path down the cone-shaped section 109. The outer screw 120 has individual spiral flights that are about the thickness of the stratum of lean, which avoids also transferring fluid with the lean. Such concentric layer of gas extends in thickness past the openings leading into the narrowed conduits 195 and 138. Such gas occupies the central concentric volume within the housing 186 bounded by the dotted line 113. As can be appreciated, such boundary 113 extends beyond the diameter of the narrowed section 195 through which the lean is transferred. Because the gas occupies the central volume of the centrifuge 1000, the gas acts as a barrier by displacing the fluid with gas, which is carried with the most dense component, i.e., the lean, via section 195 and conduit 199. As can be appreciated from the foregoing description, the centrifuge produces concentric zones of stratification based in order of decreasing density toward the central axis, wherein the most dense components accumulate next to the interior surface of the housing 186, and the least dense components being at the center of the centrifuge.

Operation of the centrifuge to separate lean and fat is based on the density differences between components.

The density of the fluid can be from 45 to 65 pounds per cubic foot, preferably from 50 to 60 pounds per cubic foot, and more preferably from 52 to 58 pounds per cubic foot. Changing the density of the fluid is believed to affect the separation efficiency. The housing 186 is rotated by a variable speed motor, such as an electric or hydraulic motor, which is attached thereto in such a manner that enables the rotating of housing 186 at a controlled speed (revolutions per minute), such as at from 300 rpm to 1000 rpm, with 500 rpm being suitable, but, preferably at such a speed (rpm) that may cause an artificial increased gravitation field to be applied to the fluid and the fat and lean particles.

Variable speed positive displacement pumps can be connected directly to all input and output conduits connected to the interior of the centrifuge 1000, in such a way that pressure can be maintained within the centrifuge. Pumps transferring ground beef and fluid via conduit 130 can be controlled to provide a selected input combined mass flow while extraction positive displacement pumps are connected to output conduits so as to enable the extraction of processed materials, such as fluid via outlet 132 to be cleaned and recycled, fat via outlet 160, and lean via outlet 199. The pressure within centrifuge 1000 can be controlled such that the density of the fluid is maintained at a selected value, such as 45 to 65 pounds per cubic foot, or about 57 pounds per cubic foot. The materials transferred into centrifuge 1000 are also maintained at a selected temperature, which can be adjusted by adjusting the pressure.

The housing 186 is manufactured from stainless steel, carbon steel or any other rigid material capable of withstanding the pressure ranges described herein. The diameter of housing 186 may be in the order of 30 inches and is rigidly attached at each end to cone-shaped sections each tapering and connecting to conduits having a smaller diameter than housing 186 and parallel thereto. The dotted lines 113 and 181 define a central annular, volume 110, which can be filled with pressurized gas, such as carbon dioxide, having been transferred therein via conduit 108 at a pressure, such that when lean is transferred across the internal beech face of cone-shaped section 109, the dense fluid that occupies the annular space defined by dotted lines 105 and 122 is not carried with the lean, can be displaced by gaseous carbon dioxide in such a way that the lean (beef) transferred into and through conduit 195 does not carry excessive quantities of carbon dioxide.

The annular space defined by and between dotted line 105 and 162 and the internal face of housing 186 shows a fraction of the internal space of housing 186 where the most dense material, i.e., lean, may accumulate; the dotted lines 105 and 122 define the boundaries of an annular space wherein fluid may tend to accumulate and the annular space defined between dotted lines 122 and 113 comprises the annular space in which the least dense fat may accumulate after centrifuging therein.

The centrifuge shown in FIG. 2, including housing 186, cone-shaped section 109, conduit 195, and cone-shaped section 169 with conduit section 137, are rigidly connected to provide a sealed and gas tight vessel, which is located and held captive by variable drive wheels 104, 202, 112, 178, 131, and 163, which rotate the centrifuge vessel 186 at speeds to produce a separating force equal to as much as 3000 G, wherein one (1) G is the equivalent of the gravitational force at the surface of the earth. However, when used in applications to separate beef fat from beef lean, the speed of the rotating centrifuge may be limited to just a few hundred rpm, exerting a centrifugal force on the materials in the order of a few hundred G or even substantially less. A relatively low G force on the order of 30 to 100 G can provide sufficient force to quickly separate fat from lean. The interior of the centrifuge can be maintained at a temperature of approximately 32-34 degrees F. The pressure can also be controlled and adjustable from 300 psig to 1100 psig, for example.

A positive displacement pump is connected to conduit 199 to transfer lean at a controlled rate proportional to the material being transferred into the housing 186. Ports 126 and 170 in beech face 171 in the cone-shaped section 125 allow surplus fluid to be transferred through annular space 168 into annular manifold 165 and through conduit 132. Conduit 132 is connected to a pressure and mass flow controlling, second positive displacement pump. A third pressure and mass flow controlling, positive displacement pump is connected to conduit 160 such that fat can be extracted from centrifuge 1000. First, second and third positive displacement pumps (not shown) respectively connected to conduits 199, 132 and 160, are controlled via a central computerized controlling system in such a manner that goods transferred by controlled variable speed positive displacement pumps through grinder 148 plus fluid transferred through conduits 156 and 142, which are also transferred by positive displacement pumps, are substantially of equal mass and balanced with the materials being extracted by pumps connected to conduits 199, 132, and 160, such that the mass of materials pumped into housing 186 are substantially equal to the mass of materials pumped from housing 186.

Accordingly, by centrifugally spinning the mixture of ground beef containing particles that are predominantly fat and particles that are predominantly lean, the fat accumulating at zone defined by lines 122 and 113 can be transferred from the centrifuge 1000 via conduit 160 by rotating the Archimedes screw assembly, simultaneously, lean accumulating in spaces 176 and 119 is transferred through conduit section 195 into space 106 and discharged via conduit 199. Fluid is extracted via conduit 132 in the direction of arrow 134. Fluid extracted via conduit 132 can be recycled after sanitizing, filtering so as to meet pressure and temperature settings, and reintroduced into conduits 142 and 156.

The centrifuge 1000 disclosed herein provides for the separation of two solids (i.e., fat and lean) and fluid. In this way, the fluid can be used as an agent facilitating the separation of the two solids (fat and lean).

Referring now to FIG. 3, a diagrammatic representation of a plan view of processing equipment intended for use in the separation of fat and lean from ground beef is shown. The apparatus shown is arranged to facilitate the recycling of fluid used in the centrifuge separation process. A rigid steel frame 9 is shown with a "bowl" 8 wherein, "bowl" is a term used in industry to describe the horizontal (or vertical) member, which is driven by a variable motor, such as an electric or hydraulic motor, such that it rotates about an axis. The bowl 8, mounted onto frame 9, is an apparatus similar to that which is represented by FIG. 2, with the changes as noted herein.

A refrigeration unit 21 with condenser 49, which may be an R22 chiller (or even liquid carbon dioxide, is arranged to chill recycled fluid, such as 50% propylene glycol, or brine, to a temperature of about 25° F., wherein brine can include any fluid, such as glycol or water and ethanol or any blend of fluids. The recycled fluid is transferred via conduit 27 in the direction shown by arrow 34 to a plate heat exchanger 30 mounted upon frame 31, which may comprise a rigid steel weldment or steel casting. After absorbing heat from a relative hot fluid, the fluid is then returned in the direction shown by arrow 29 via conduit 26 to the refrigeration unit 21. The refrigeration unit 21 includes a heat exchanger enabling the controlled temperature reduction of the recycled fluid, which can be pumped there through at a controlled mass flow rate wherein the temperature of the fluid may be reduced to 25 degrees F. The plate heat exchanger 30 is arranged with a series of steel plates and suitable sealing means, such as "O" rings. The term "plate heat exchanger" is used in industry to describe a special type of heat exchanger which can be opened to enable cleaning. In a plate heat exchanger, any number of plates and sealing means ("O" rings) can be arranged in a sandwiched arrangement with each plate in vertical disposition, parallel and "in line" with each other plate and also arranged to slide horizontally along retaining shafts rigidly attached to frame 31. Retaining shafts are arranged such that steel plates can be opened and spread apart from each other enabling the cleaning of each plate on both sides.

The construction of the plate heat exchanger 30 with frame 31 can be more readily understood with reference to FIG. 4, wherein a full side view elevation is shown. A rectangular steel plate 42 with vertical edge 36 and horizontal edge 33 is shown with four apertures 39, 37, 43, and 40 arranged wherein each aperture is located at a corner of the rectangular plate 42. The purpose of the plate heat exchanger 30 is to enable the temperature control of the fluid from the centrifuge, which may contain a food or fat component or particles of protein wherein the particles can contact, adhere and become bonded to the heat exchange surface. Two fluids, one "cold," one "hot," are processed simultaneously with the plate heat exchanger. The cold fluid, such as 50% glycol, is recycled through the refrigeration unit and passes on one side of the plates in the plate heat exchanger 30. The hot fluid passes on the side of the plates that are opposite of the cold fluid. The hot fluid releases heat across the plates and the heat raises the temperature of the cold fluid, thereby driving the temperature of the hot fluid down and the temperature of the cold fluid up. The plate heat exchange 30 can be a co-current or counter-counter exchanger. Pressure, flow and temperature measuring devices, are located at any one or more of the inlets and outlets of the plate heat exchanger 30, from which readings the flow, pressure or temperature of one or both fluids can be controlled. Any style of heat exchanger may be used, including, for example, a shell and tube heat exchanger, however, in this instance, a plate heat exchanger is illustrated. Furthermore, the fluid can be pasteurized by heating to a temperature of about 160° F., 180° F., or 200° F., for example, or the fluid can be irradiated via UVc energy.

Steel plate 42 shown in FIG. 4 is profiled with a series of depressions formed in continuous channels 44 and a sealing mechanism, such as an "O" ring, is located in a corresponding "O" ring groove, such that a selected quantity of steel plates can be pressed and clamped together in a sealing manner with "O" ring seals located between each plate. Multiple steel plates similar to the single steel plate shown as 42 in FIG. 4 are stacked in a sandwiched arrangement, wherein the two opposite faces of each plate are in contact with a face of an adjacent plate to provide a group of plates, which are then clamped together such that one fluid can be transferred along the channels on one side of each plate, and the second fluid is transferred along the channels on the opposite side. Thereafter, plates can be added or removed to adjust the total surface area available for heat transfer. In one embodiment, the steel plates are arranged such that the cold fluid recycled along conduits 27 and 26 and through refrigerated heat exchanger 21 can enter at aperture 37 and exit at aperture 40.

Aperture 37 can be connected to conduit 27 in FIG. 3 and aperture 40 in FIG. 4 can be connected to conduit 26 in FIG. 3. In this way, temperature controlled cold fluid transferred via conduit 27 can travel by reticulation along the channels in each steel plate and across the surface of the plate and then through aperture 40 and into conduit 26 to be returned to refrigeration unit 21. The cold fluid can be at a temperature such as 24 degrees F. Hot fluid, such as water, optionally with carbon dioxide or chlorine dioxide, can be transferred in the direction shown by arrow 12 through conduits 45 and 35 into steel plate heat exchanger 30 between opposite sides of the steel plates and then through conduits 32 and 18 in the direction shown by arrow 22. The fluid may be cooled from 0° F. to 66° F., from 26° F. to 36° F., or from 28° to 34° F., or from 30° F. to 32° F. Conduit 35 corresponds and connects directly with aperture 39 shown in FIG. 4 and conduit 32 corresponds directly with aperture 43 in FIG. 4. Conduit 45 is a feed line to plate heat exchanger 30 and conduit 32 is a return line from plate heat exchanger 30 for the fluid used in the centrifuge separation process of the apparatus of FIG. 2. Conduit 45 is connected directly to manifold 2 (FIG. 3) such that fluid extracted from bowl 8 is run through the plate heat exchanger 30 and cooled and is returned to bowl 8 through manifold 48 (FIG. 2).

Referring briefly to FIG. 2, apertures 126 and 170 are provided in the beech face 171 of the cone-shaped section 125. Apertures 126 and 170 connect to annular conduit 137 enabling the extraction of fluid from zone 118 through annular space 168 and into manifold 165, which connects to conduit 132. Similar apertures, beech face, annular space, manifold and conduit may be provided at the opposite end of vessel 186 at the cone section 109, but are not illustrated. In this way, fluid could be withdrawn from conduit 132, and after chilling in the plate heat exchanger 30 (FIG. 3) can be introduced into housing 186 at the opposite end from conduit 132. This has the advantage that the consumption of fluid for the purpose of chilling ground beef is reduced and can be minimized to provide improved economy.

Referring again to FIG. 3, ground beef particles, wherein the particles have been ground to a small size such that the particles are predominantly lean and predominantly fat, and blended with a controlled proportion of fluid, can be transferred into conduit 47 in the direction shown by arrow 16.

Lean separated from ground beef in a manner as described in connection with FIG. 3 can be extracted from conduit 1. Cone-shaped ends 7 and 10 are arranged in similar manner to cone-shaped sections 109 and 125 in FIG. 2. Bearings 11 and 51 are provided to enable the precise and unrestricted rotation of bowl 8 with concentric conduits 1, 41, and 5 at one end, and 47, 17, and 12 at the opposite end of bowl 8. The operation of centrifuge apparatus shown in FIG. 3 with bowl 8 can be arranged so as to operate similarly to bowl 186 as shown in FIG. 2; however in FIG. 3 two additional manifolds 2 and 4 are shown. Lean separated from ground beef transferred into conduit 47 is extracted from conduit 1. Fat separated from ground beef transferred into conduit 47 can be extracted via manifold 46. Temperature controlled fluid having been treated in plate heat exchanger 30 (FIG. 3) with refrigeration unit 21 can be transferred into bowl 8 via conduit 48, and an equal quantity of fluid can be extracted from the bowl 8 via conduit 2.

The size of particles comprising the ground beef can be selected by inserting a properly sized grinding plate 148, shown in FIG. 2. The size of the grinding plate 148 apertures can be arranged such that the minimum quantity of lean is carried with the fat, and also so that the minimum quantity of fat is retained in the lean. In order to achieve the most efficient system of lean beef separation from high fat ground beef, a two stage process can be arranged. In such process, a grinding plate aperture having a size of between 1/4" and up to 1" diameter or even more can be used to grind boneless beef in a first grinding operation. Following such coarse grinding and separating of very high lean content beef in a first stream, a second fat stream containing a quantity of lean, such as a quantity equal to 10% or even 20% by weight of the fat stream, can then be ground using a grinding plate having apertures of 1/16" diameter up to 1/4" diameter, or as may be determined to be an optimum grind plate size for a second stage processing operation. This second stage operation may be described as a fine ground stream, which can then be processed through the centrifuge equipment as described in connection with FIGS. 2-4, such that, in this second or final stage, only fat is extracted in the fat stream and the lean stream may then be combined with other ground beef. If required, the fat stream derived in the "final" stage can be processed in a further stage by grinding via an even finer grind plate aperture size, such as 1/32" diameter, followed by processing according to the separation process as described herein.

In one alternate embodiment, a selected and proportioned quantity of water optionally containing a quantity of a salt, such as sodium chlorite, may also be blended with the fluid. The amount of sodium chlorite salt added can be that amount required to provide 500 parts per million (ppm) to 1% or 2% or more in solution. Any other salts or additives, including chlorine dioxide may be included in the mixture to provide an anti-microbial effect. In addition, liquid carbon dioxide, when combined with sufficient water, can create a pH value of about 2 to 3, which is adequate to react with sodium chlorite, wherein the combined quantity is commonly known as acidified sodium chlorite which has anti-microbial properties capable of reducing bacteria content by several logs. Furthermore, the addition of sodium chlorite can be added in such proportions so as to adjust the density of the fluid which can be utilized to enhance the separation of fat from lean.

Referring to FIGS. 5-12, another centrifuge and grinder for the separation of fat from ground beef is illustrated.

Figure 5:
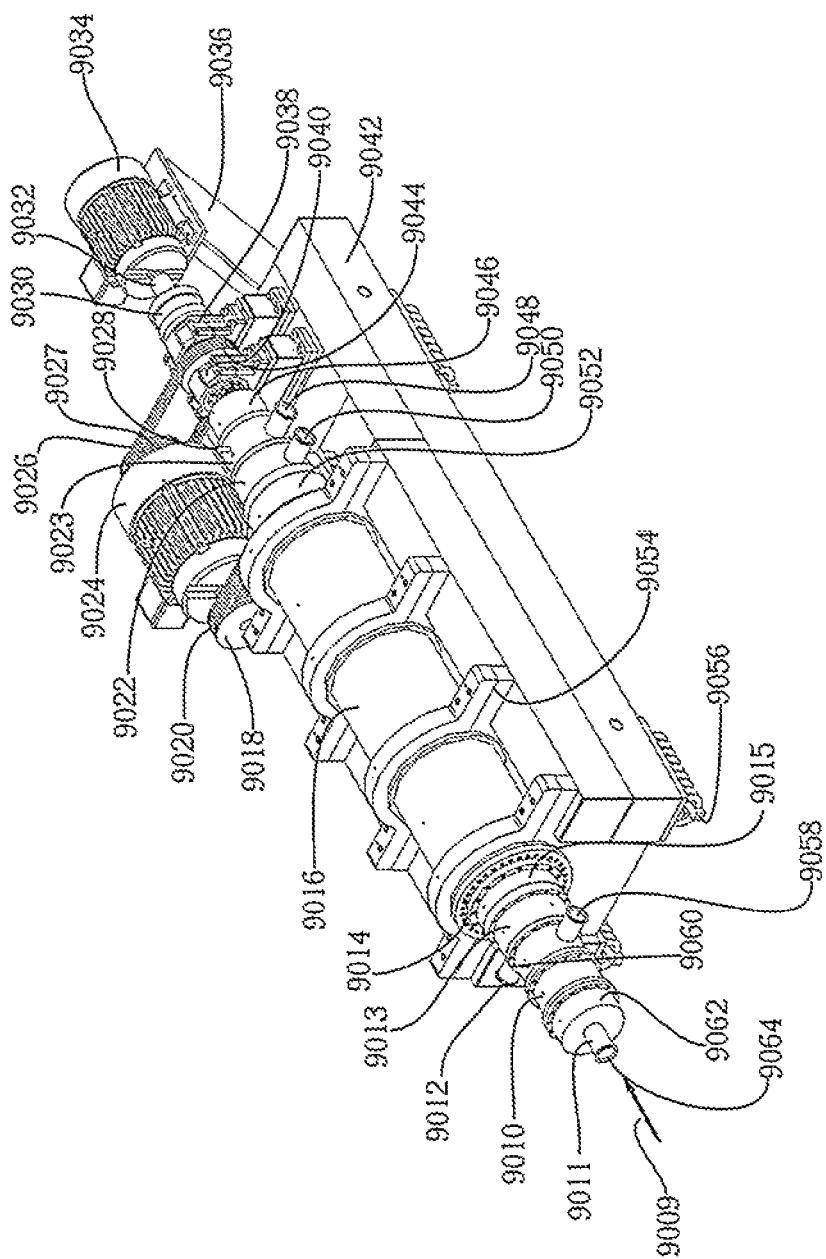
FIG. 5 is a diagrammatical illustration of a centrifuge for the separation of fat and lean.

In FIG. 5, a rigid steel base 9042 with shock absorbing floor contact mounting members, such as 9056 is arranged to retain an assembly comprising a horizontal cover 9016 rigidly held in place by suitable brackets, such as 9054, and collectively housing a decanter style centrifuge bowl, which cannot be seen in this illustration. The bowl is arranged to rotate at a speed generating a centrifugal G force of about 3000 or more; however, to separate fat from lean, the speed of the rotating enclosed bowl may be limited to just a few hundred rpm, exerting a centrifugal force of a few hundred G or less. A relatively low G force on the order of 30 to 100 G can provide sufficient force to quickly separate fat from lean, maintained at a temperature of approximately 32-34° F.

A series of annular collars with interposed manifold segments and extraction ports connected directly to the manifolds are arranged in such a manner that a sealed enclosure is maintained within the above centrifuge bowl. A segment 9062 is attached directly to an adjacent segment 9010, which, in turn, is attached in a sealing manner to manifold 9060, which, in turn, is attached in a sealing manner to manifold 9013, which, in turn, is attached to innermost annular segment 9015, which is attached by a plurality of screws tightened adequately and attaching the annular segment 9015 directly to the enclosure cover 9016. Extraction port 9012 is connected directly to manifold 9013 through which separated fluid, such as liquid carbon dioxide, is extracted after separation.

Port 9012 is connected directly to a conduit pressurized so as to enable the efficient extraction of fluid or liquid carbon dioxide and carry the fluid or liquid carbon dioxide to a positive displacement pump controlling the flow of the fluid at a rate as to maintain a quantity of liquid carbon dioxide within the centrifuge bowl, which may enable the efficient separation of lean and fat in separate stratified layers wherein the lean may be stratified in an outer layer and the fatty tissue, fat, or adipose tissue shall be stratified in an inner layer adjacent to a stratified layer of liquid carbon dioxide. More particularly, the layer of liquid carbon dioxide may stratify between the inner layer of fat and the outer layer of lean such that the excess and liquid carbon dioxide can be extracted via port 9012 in a controlled pressurized enclosed process.

Port 9058 is attached directly to manifold 9060, which, in turn, connects to the termination point of the inner Archimedes screw (shown as 11381 in FIG. 7 below) mounted within the centrifuge bowl and provided to extract the stratified fat, which is transferred to manifold 9060 and then through conduit 9058. Conduit 9058 is most preferably connected directly with a positive displacement pump arranged to control the transfer of fat at a mass flow rate that corresponds to the mass flow of blended goods in conduit 9064 in the direction shown by arrow 9009. Annular segment 9052 is attached to the alternate end of enclosure 9016 and in turn is attached to manifold 9022. In turn manifold 9022 is attached to manifold 9023. Manifold 9022 is fitted with an extraction port 9050 connected directly thereto, and manifold 9023 is fitted with an extraction manifold 9048. An additional port 9028 is attached also to manifold 9023. Manifold 9023 is fixed rigidly to annular segment 9046.

A rigid fixed sealed enclosure, horizontally disposed and having a round cross section comprising said centrally disposed cover 9016 of tubular profile, connects with annular segments and manifolds comprising two sets, one at each end of cover 9016 and all rigidly fixed and directly or indirectly attached and fixed via brackets, such as 9054 to said steel base frame 9042 and in such a manner that said centrally located shaft 9011 is mounted via suitable bearings and seals in such a way that main drive electric motor 9024 and spiral drive motor 9034 bear directly thereon via direct coupling at 9032 for drive motor 9034, and a first drive belt 9020 and second drive belt 9026 connecting said electric motor 9024 via pulleys 9018 and 9026 located at opposing ends of said electric motor 9024, attached to a common drive shaft centrally disposed.

A centrally and horizontally disposed shaft 9011 is located at the center of said manifold and annular segment members attached to cover 9016 wherein said shaft 9011 comprises conduit 9064 at the input end of said centrifuge connecting directly to drive shaft 9032, which in turn connects directly to drive motor 9034. Central shaft 9011 comprises additionally two concentric spiral Archimedes screws including an inner spiral screw capable of transferring solids from a centrally disposed region of centrifuge bowl within cover 9016 with an outer Archimedes screw also rigidly concentrically connected with central shaft 9011 and the first spiral Archimedes screw and having an outer profile in virtual contact with the inner surface of the bowl wherein the virtual contact is saved only by a small clearance arranged to enable the effective transfer of solids or viscous fluids that accumulate in contact with the inner surface of the bowl. The outer screw in close virtual touching proximity to the inner surface of the centrifuge bowl is arranged to transfer stratified goods from within the bowl ultimately to manifold 9022 and through the extraction port 9050.

Particles of ground beef, including particles that are predominantly fat and particles that are predominantly lean, accumulate via stratification. Lean particles in direct contact with the inner surface of the centrifuge bowl may be transferred by the outer Archimedes screw to space within manifold 9022 and subsequently through port 9050, which is in direct communication with a controlled positive displacement pump. Lean is transferred through port 9050.

The inner concentric screw is arranged to transfer fat particles that accumulate at the innermost and central region of the centrifuge bowl. The fat is transferred toward and then into the enclosure of the manifold 9013 and subsequently is extracted via port 9012. Motor 9024 is arranged to drive centrally disposed concentric screws and shaft 9011 at a speed so as to enable the rapid and effective separation of fat, which accumulates in a region facilitating extraction by transfer of the innermost spiral Archimedes screw through manifold 9013 and port 9012. However lean is transferred by the outer Archimedes screw after accumulation against the inner surface of the centrifuge bowl and into manifold 9022 prior to extraction via port 9050.

A blend of boneless ground beef and fluid, and any other additive, is pumped by injection in the direction shown by arrow 9009 into conduit 9064 of shaft 9011. Shaft 9011 and concentric Archimedes screws rotate at a greater speed than bowl within enclosure 9016. This speed differential between the shaft and screw assembly and bowl located within cover 9016 is provided by drive electric motor 9034 via a radial gearbox 9030 wherein an output drive is connected to the bowl while the reducer 9030 is attached directly to shaft 9032 in such a way that drive motor 9034 ordinarily rotating at the same speed as determined by drive motor 9024 provides an increased speed of rotation by a number of revolutions per minute of the inner shaft 9011 and concentric Archimedes screw assembly relative to the outer centrifuge bowl. In this way, the blend of ground beef and fluid pumped at a predetermined mass flow through conduit 9064 in the direction shown by arrow 9009 is released after transfer into a central disposition within the bowl, after a residence time of approximately 30 seconds. The lighter fat particles accumulate at a centrally disposed region of the bowl while the heavier lean particles accumulate at an outermost stratified annular region and in contact with the inner surface of the centrifuge bowl, thereby enabling the outer concentric Archimedes screw to transfer the heavier particles that are predominantly lean. into manifold 9022 and then through port 9050.

Water or any other fluids as may be selected to enhance performance of the process can be injected via port 9028. For example, a clean and pure quantity of water can be transferred through port 9028. Optionally, water may include carbon dioxide and/or chlorine dioxide. Fluids contained in the slurry injected via conduit 9064 are extracted by positive displacement pumping means through extraction port 9058 controlled at a mass flow rate so as to maintain the stratified level of each layer of particles and fluid within the bowl at a suitable level. Pressurized and dense phase gas can be pumped via a positive displacement pump into port 9048 under certain temperature and pressure conditions within the bowl. However, in other conditions caused by controlled elevated temperature, carbon dioxide gas may be extracted via port 9048.

A purpose of transferring gas in either direction via port 9048 is to provide for a more effective separation of solids. Any gas present within the bowl housed within cover 9016 may most likely be the least dense of any fluid within the bowl and may occupy a space closest to the centerline of the bowl parallel with the longitudinal sides of the bowl. More particularly, the gas within the bowl may be derived from fluid such as liquid carbon dioxide present within the bowl or alternatively, injected into the bowl via a suitably located port such as port 9048 but whichever way gas is provided within the bowl, the gas can occupy a space of tubular profile and a substantially round cross section wherein sides of the tube are parallel with the sides of the bowl. The space occupied by the gas is displaced by the central shaft and wherever sections of the Archimedes screws attached thereto intersect the gas.

The centrally disposed space filled with gas can assist in the separation of the solid particles that are predominantly fat or lean by filling the centrally disposed innermost region adjacent to an outer stratified layer of the next lightest matter, which may form a layer around the gas region during operation of the centrifuge. Furthermore, the heaviest component injected via port 9064 occupies a stratified space comprising a layer in contact with the inner surface of the rotating bowl. The fluid can have a density less than the heavier particles that are predominantly lean and greater than the lighter particles that are predominantly fat. A fluid such as water, with or without carbon dioxide, an acid, and/or chlorine dioxide can be used to enable separation of the fat particles from lean particles.

Lean having a density of approximately 66 lbs/cu. ft. accumulates in the region immediately adjacent to the inner surface of the bowl. Water, with carbon dioxide, and or chlorine dioxide may have a density of approximately 59 lbs/cu. ft., and may accumulate in a stratified annular space immediately against the inner surface of the lean. The fat having a density of approximately 55 lbs/cu. ft. may accumulate at the innermost central region, when gas is not present. When gas is present, which may comprise dense phase carbon dioxide gas, the gas may occupy the space closest to the center of the bowl during operation. It can therefore be readily understood that when a blend of ground beef comprising particles of predominantly lean and particles of predominantly fat, and a fluid, is transferred through port 9064 in the direction shown by arrow 9009, the lean particles with a reduced component of fat and fluid can be extracted via port 9050, and the fat particles with a substantially reduced lean content may be extracted via port 9012. Fluid can be extracted via port 9058 and can be recycled after blending with ground beef of selected lean content and returned with blended ground beef via port 9064 in the direction shown by arrow 9009.

The drive mechanism comprises two electric motors wherein the main bowl drive means, electric motor 9024, transmits the driving force independently to the bowl via transmission belt 9020 and pulley 9018 and the Archimedes screws are driven by transmission belt 9026 and pulley 9027 with pulley 9044 fixed to main Archimedes screw shaft and retained between bearing blocks 9040 and 9038 and in such a manner that an end of the shaft fixed to the Archimedes screws is connected to motor 9034 mounted upon bracket 9036 via drive shaft 9032. Drive shaft 9032 is connected to a suitable planetary gearbox 9030, which in turn is attached to a tube rotating about the drive shaft at the same speed as the bowl to which it is coupled via timing belts 9026 and 9020. Therefore, in this way said Archimedes screws can be driven at a speed greater than the rotational speed of the bowl. For example, the bowl may rotate at 500 rpm, and the Archimedes screws may rotate at 590 rpm. In this example, the differential between the shaft speed driving said Archimedes screws and the speed at which the bowl rotates, is 90 rpm. It should be noted that such differential can be adjusted to suit the optimum production rates as required and may be adjusted by interchanging the gear ratio of gearbox 9030.

Figure 6:
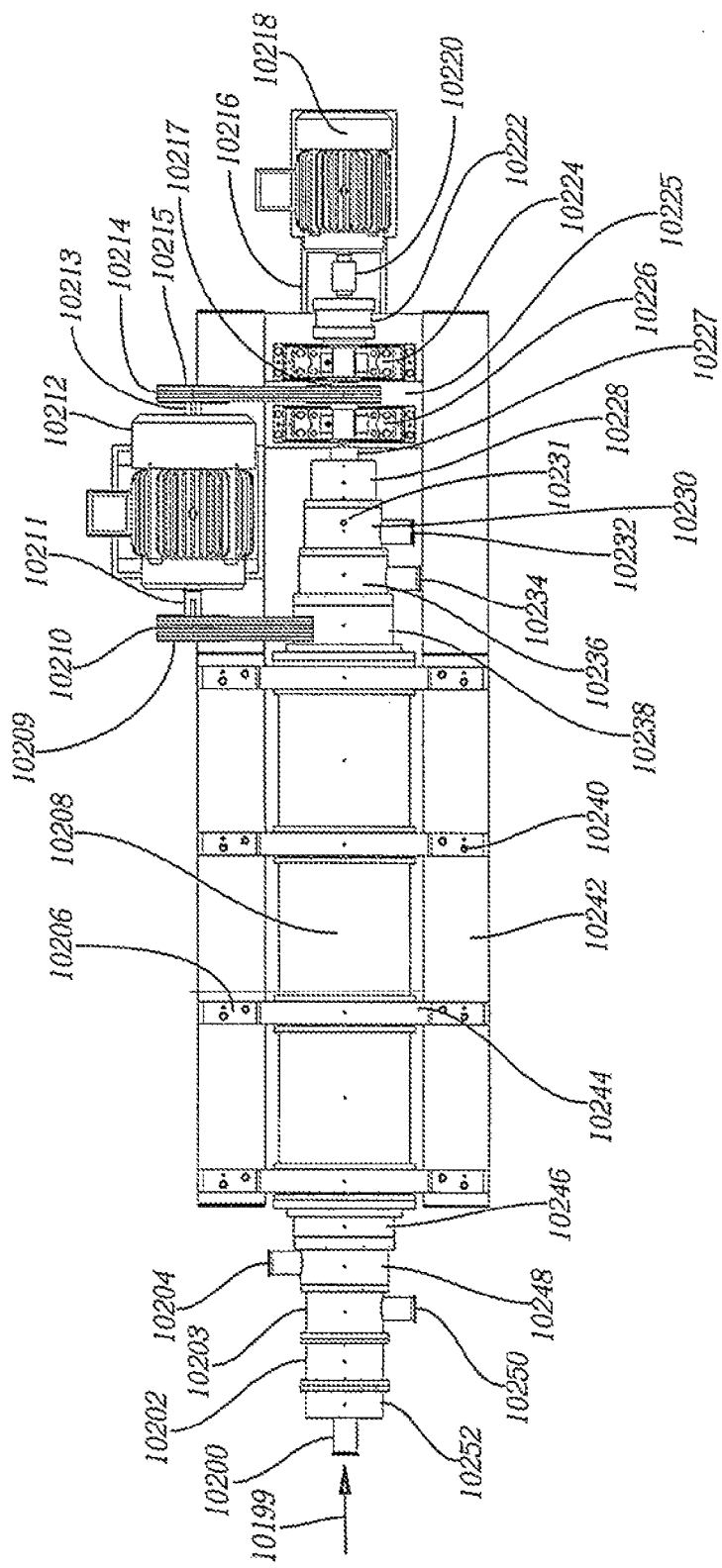
FIG. 6 is a diagrammatical illustration of a centrifuge for the separation of fat and lean.

Referring now to FIG. 6, a plan view of the centrifuge apparatus as described in association with FIG. 5 is shown. A rigid base frame 10242 provides a solid base to which the centrifuge assembly with central cover 10208 is mounted via brackets such as 10244 at mounting point such as 10206 and a series of bolts such as 10240. In this way, a centrally mounted rigid cover 10208 is held rigidly and bearing blocks 10226 and 10224 are mounted to suitably machined mounting pads such as 10225. Planetary gearbox 10222 is attached to a sleeve rotating about a central shaft 10220, which in turn is connected directly to Archimedes screw drive motor 10218. Drive motor 10218 is mounted to bracket 10216 and rigidly fixed via bolts to a machined mounting pad representing a horizontal surface rigidly fixed to frame 10242 via bracket 10216. Electric drive motor 10212 is rigidly mounted to base frame 10242 and comprises a drive shaft 10211 with a first bowl driving pulley 10209 fixed to a first drive 10211 with transmission timing belt 10210 providing the main drive to the centrifuge bowl. A second pulley 10215 mounted rigidly to a second end of electric motor 10212 drive shaft at 10213 has a timing belt 10214 to transmit drive force to a pulley mounted rigidly to outer drive tube 10217, which in turn is fixed at an end of planetary gearbox 10222. Drive shaft 10220 is centrally located providing driving force to Archimedes screws mounted to the central shaft within outer drive tube 10217.

Differential speed between Archimedes screws enclosed and sealed within the bowl housed within cover 10208 and the Archimedes screws, is provided by electric motor 10218, which can be adjusted by varying the speed at which the motor 10218 drives the shaft 10220. Shaft 10220 is rigidly mounted effectively between the outer centrifuge bowl driven via pulley 10210 attached to variable speed electric motor 10212 thereby enabling a variable speed of the Archimedes screws relative to said centrifuge bowl. The speed of the Archimedes screws is variable relative to the bowl, which is driven by the variable speed electric motor 10212. Shaft 10200 comprises the extreme opposite end of a continuous shaft connected directly to drive shaft 10220. Central Archimedes drive shaft 10200 is typically gun drilled to a selected depth enabling the injection of primary blend of goods, such as ground beef blended with liquid carbon dioxide in the direction shown by arrow 10199.

A conduit within shaft 10200 provides for the transfer of the fluid goods into the centrifuge. Sealing covers are fixed by fixtures so as to enclose a series of conduits enabling the transfer of separated components away from the centrifuge after separation has occurred therein subsequent to transfer of the primary blended fluid transferred therein in the direction shown by arrow 10199. Outer cover 10252 is provided with a seal about rotating shaft 10200 so as to substantially prevent the escape of any fluids or solid component of the goods being processed, at a first side and attached rigidly via suitable fixtures at a second side to adjacent cover 10202, which in turn is fixed rigidly and sealed to manifold 10203 with port 10250 attached thereto. Port 10250 corresponds with the port 9058 shown in FIG. 5. Port 10204 corresponds with port 9012, as shown in FIG. 5 and described herein above. Manifold 10248 is rigidly fixed to manifold 10203 at a first side and at a second side is sealed by rigid attachment to cover 10246. Cover 10246 is rigidly attached and sealed at the attachment to bowl cover 10208, which in turn is attached to cover 10238. Cover 10238 is machined so as to enable the connection of the centrifuge bowl to drive shaft 10211 of variable speed electric motor 10212 via transmission timing belt 10210. Manifold 10236 is sealingly fixed to cover 10238 at a first side with extraction port 10234 connected directly thereto and sealingly attached at a second side to annular manifold 10230. Extraction port 10234 corresponds with port 9050, as shown in association with FIG. 5. Manifold 10230 is directly attached to port 10232 with a first side attached to manifold 10236 and a second side sealingly attached to end cover 10228. Extraction port 10232 corresponds with port 9048 in association with FIG. 5, and port 10231 is arranged to allow the injection of fresh liquid carbon dioxide having no impurities therein so as to connect with central shaft enabling the transfer of the fresh liquid carbon dioxide (or any other fluid) through a series of ports and ultimately into the closest end cone "beech" region within the centrifuge. Port 10231 corresponds with port 9028 in FIG. 5. End cover 10228 is provided with a sealing mechanism about central shaft at 10227. End cap 10228 corresponds with end cap 9046 as shown in FIG. 5, and end cap 10252 corresponds with end cap 9062 in FIG. 5 and conduit 10200 as shown in FIG. 6 corresponds with conduit 9011 as shown in FIG. 5.

Figure 7:
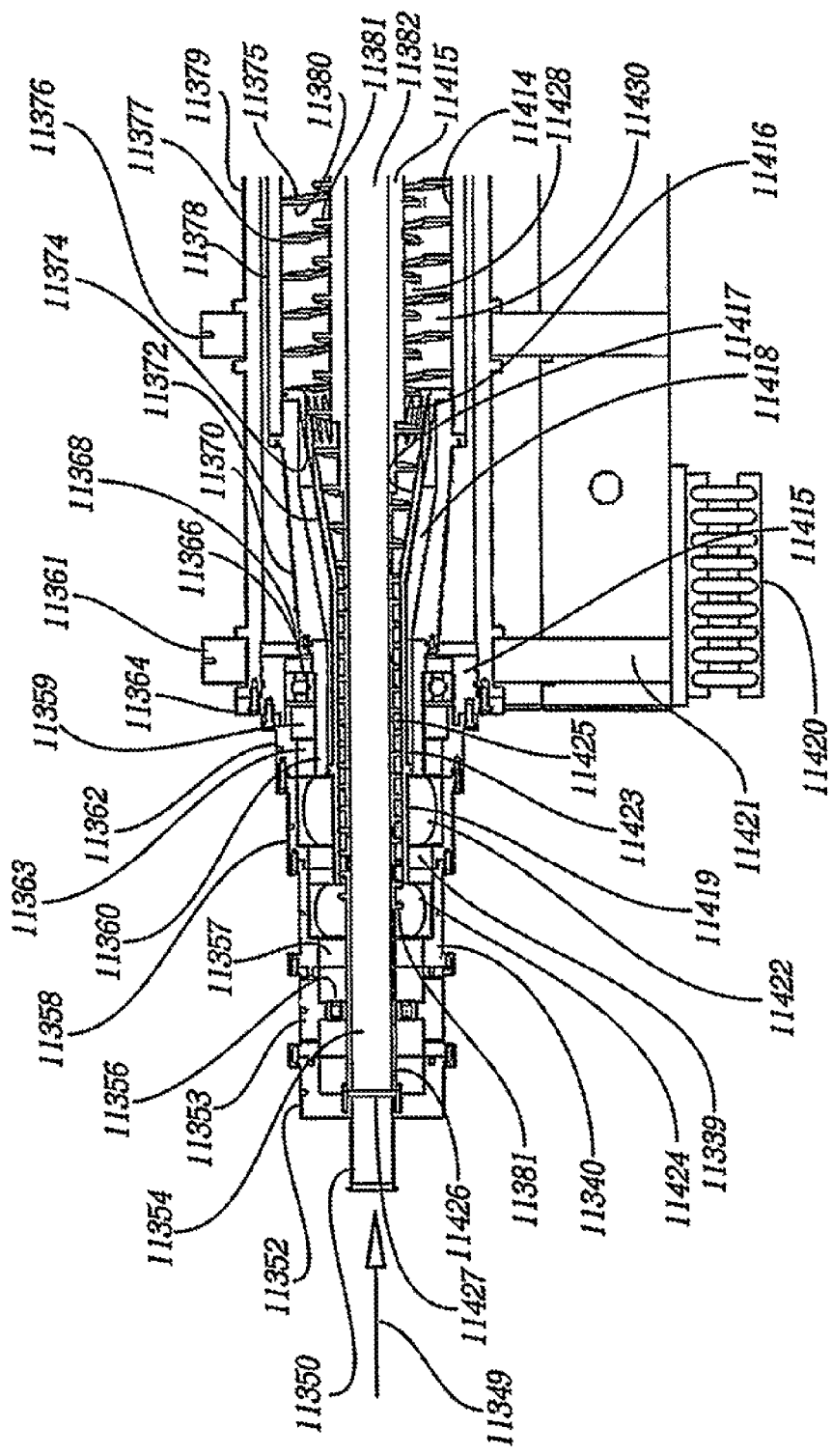
FIG. 7 is a diagrammatical illustration of a centrifuge for the separation of fat and lean.

Referring now to FIG. 7, a cross section through a portion of the centrifuge as described in association with FIGS. 5 and 6 is shown. For ease of identification, components are enlarged and the input end of the centrifuge only is shown in FIG. 7. In order to provide a thorough comprehension of this view, it should be noted that the cross-sectional view shown in FIG. 7 includes a cross section extending from the input port 11350, which is equivalent to input port 10200 in FIG. 6 to an imaginary line dissecting the centrifuge at a point shown by that point identified as 10208 in FIG. 6 or 9016 in FIG. 5.

A rigid frame 11421 mounted to shock absorbing pad 11420 is rigidly fixed to an outer annular cover 11379 by containment within brackets 11361 and 11376. In turn, bowl 11378 is connected and sealed to end cone 11370, which in turn is attached to member 11360. Cone shaped profile 11370 encloses an annular cone shaped cavity 11418, which is in turn enclosed by annular tapered section 11372, which terminates at its connection with tube 11419 enclosing the parallel screw section of Archimedes screw 11381, which is the inner Archimedes screw provided to transfer stratified goods through conduit 11419 after separation from substantially all other fluids as Archimedes screw 11381 carries goods up beech inner surface 11417 and then into conduit space such as 11425 and into manifold space 11424. Manifold space 11424 corresponds with space of manifold 11203 as shown in FIG. 6. End cover 11352 is provided with a seal 11427 enabling inner conduit 11350 to rotate freely while in direct sealed connection with conduit section 11350 enabling transfer of ground beef, blended with other fluids through end conduit section 11350 in the direction shown by arrow 11349.

Conduit space 11354 within conduit shaft 11426 is connected directly to shaft 11415 about which two concentric Archimedes screws comprising inner screw 11381 and outer screw 11380 are connected directly thereto. Shaft 11414 comprises a rigid constructed fabrication of preferably stainless steel with Archimedes screw 11381 arranged to transfer separated fat from the inner stratified location in space 11428 toward manifold space 11424. The stratified innermost fat located in space 11428 is transferred within cone profile of end cone 11372 having an inner surface 11417 typically known as a "beech." Stratified fluid, such as water, is extracted through a series of apertures arranged in an annular formation around the mouth of the cone 11372 and arranged to allow fluid to be extracted from space 11430 and at a controlled rate via manifold space 11418, communicating directly with annular space 11423 and terminating at manifold 11358 inner space 11422.

A roller bearing 11356 is arranged to retain conduit shaft 11426 within outer housing cover 11353. A seal 11357 is located between shaft 11426 and manifold 11340 so as to prevent any matter contained within space 11424 escaping there from. An additional seal is provided at 11339 to prevent the escape of fluid retained within manifold 11358 space 11422. An additional seal 11363 is provided to prevent escape of fluids or any matter contained within manifold 11358 space 11422, and into space 11359 within annular cover 11362. Ball bearing 11366 is located within annular member 11415, which maintains the rigid yet free rotating of member 11370 and those components attached thereto such as bowl 11378. An annular plate 11368 is located and fixed rigidly to tube section 11360 at its connection point to member 11370. Archimedes screw 11380 is rigidly fixed to Archimedes screw 11381, which in turn is rigidly fixed to central shaft 11415 to provide a single component retained within bowl 11378 and in such a manner that the outer edge 11377 of Archimedes spiral member such as 11375 is in very close proximity to the inner surface 11414 of bowl 11378. It can therefore be seen that blended goods such as a combination of ground beef of particles that are predominantly fat and particles that are predominantly fat and fluid transferred through conduit 11382 in the direction shown by arrow 11349 and ultimately into spaces such as 11428 and 11430 may stratify, such that particles of predominantly fat can be transferred by Archimedes screw 11381 into manifold space 11424, and particles of predominantly beef can be transferred by Archimedes screw 11375 in the opposite direction and in the direction shown by arrow 11349.

Figure 8:
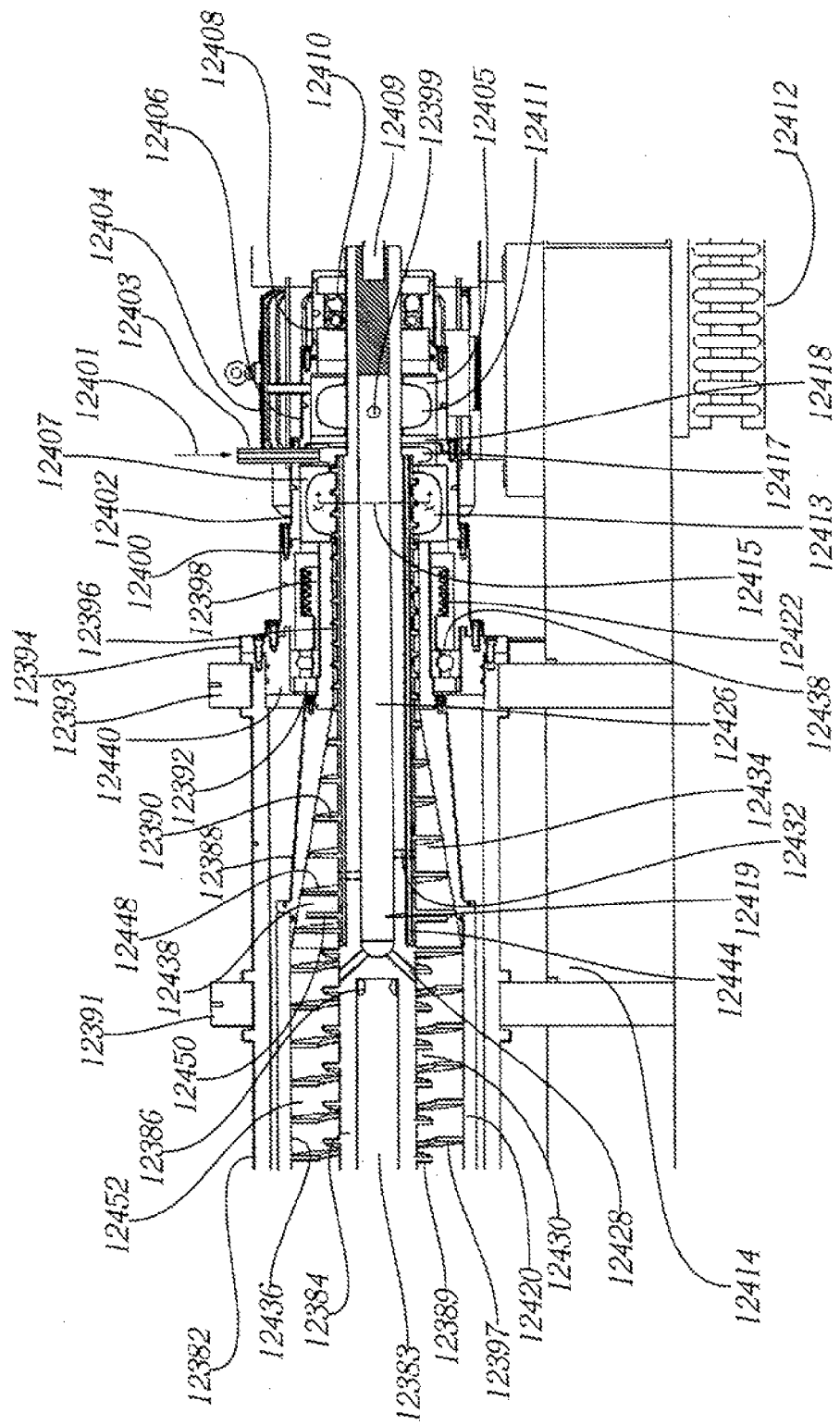
FIG. 8 is a diagrammatical illustration of a centrifuge for the separation of fat and lean.

Referring now to FIG. 8, a cross section through the apparatus as shown in association with FIGS. 5 and 6 wherein the cross-sectional view is of a vertical plane passing through the centerline of shaft 12384 is shown. This view shows the other half of the apparatus shown in FIG. 7. When FIG. 7 and FIG. 8 are placed end to end with the right hand side of FIG. 7 adjacent to the left hand side of FIG. 8, a cross section through the entire length of the centrifuge can be seen such that goods transferred in the direction shown by arrow 11349 in FIG. 7 are transferred into conduit 12383 in shaft 12384 as shown in FIG. 8.

Goods transferred into conduit 12383 are dispersed through radially drilled holes such as 12386 provided in shaft 12385. The continuation of outer Archimedes screw 11380 in FIG. 7 can be seen in 12397 in FIG. 8. Similarly, inner Archimedes screw 11381 as shown in FIG. 7 is a continuation of inner screw 12389 in FIG. 8. Outer cover 12382 is rigidly mounted via brackets 12391 and 12393 to base 12414, which is rigidly mounted to shock absorbing pads 12412. Drive shaft 12384 is attached to a variable speed electric drive motor not shown via key 12409.

An electric motor 12404 is arranged to drive bowl 12420 and tapering end member 12388 connected via conduit segment 12396 to pulley 12398 via a transmission drive belt 12422. Electric motor 12404 is provided with a variable speed feature and arranged to ensure that the rotational speed of bowl 12420 is different to the rotating speed of shaft 12384 with attached Archimedes screws. Port 12399 in shaft 12384 communicates directly with space 12411 of manifold 12405, which in turn connects with conduit 12426. Ports such as 12428 therefore enable the transfer of gas such as dense phase carbon dioxide gas into space 12430. Ports such as 12432 allow gas to be transferred into space such as 12434. Alternatively, excessive gas generated within space such as 12430 can be transferred therefrom via conduit 12428 drilled in shaft 12384 and subsequently through conduit 12426.

The particles of predominantly lean accumulated against the inner surface 12436 of bowl 12420 can be transferred into manifold 12407, space 12413. Bearing 12438 is arranged to enable the free rotation of hollow shaft 12396 while the hollow shaft 12396 is held rigidly in place relative to annular ring 12440. Annular ring 12396 is attached to member 12388 and bowl 12436 rigidly such that bowl 12436 rotates with pulley 12398 driven by motor 12404. A conduit 12403 is attached with direct communication to a positive displacement pump so as to enable the transfer of a controlled mass flow quantity of fluid in the direction shown by arrow 12401 and into manifold space 12417. Manifold space 12417 connects to conduit 12444, which comprises one of several radially gun drilled conduits that allow the transfer of fluid into spaces such as 12448. A flat disc member 12450 is attached rigidly to shaft 12384 such that a peripheral space is provided between flat disc 12450 outer edge and member 12388 inner surface. Disc like plate 12450 is arranged to restrict flow of lean around its periphery and into space 12448 from space such as 12452. Archimedes screw 12397 rotates and carries lean toward manifold space 12413 and through said space around disc 12450. Fluid can be transferred via port 12403 and into space 12448 so as to displace any other fluids, such as water or salt solutions, with the lean as it is carried along the inner surface of member 12388 toward manifold space 12413.

Figure 9:
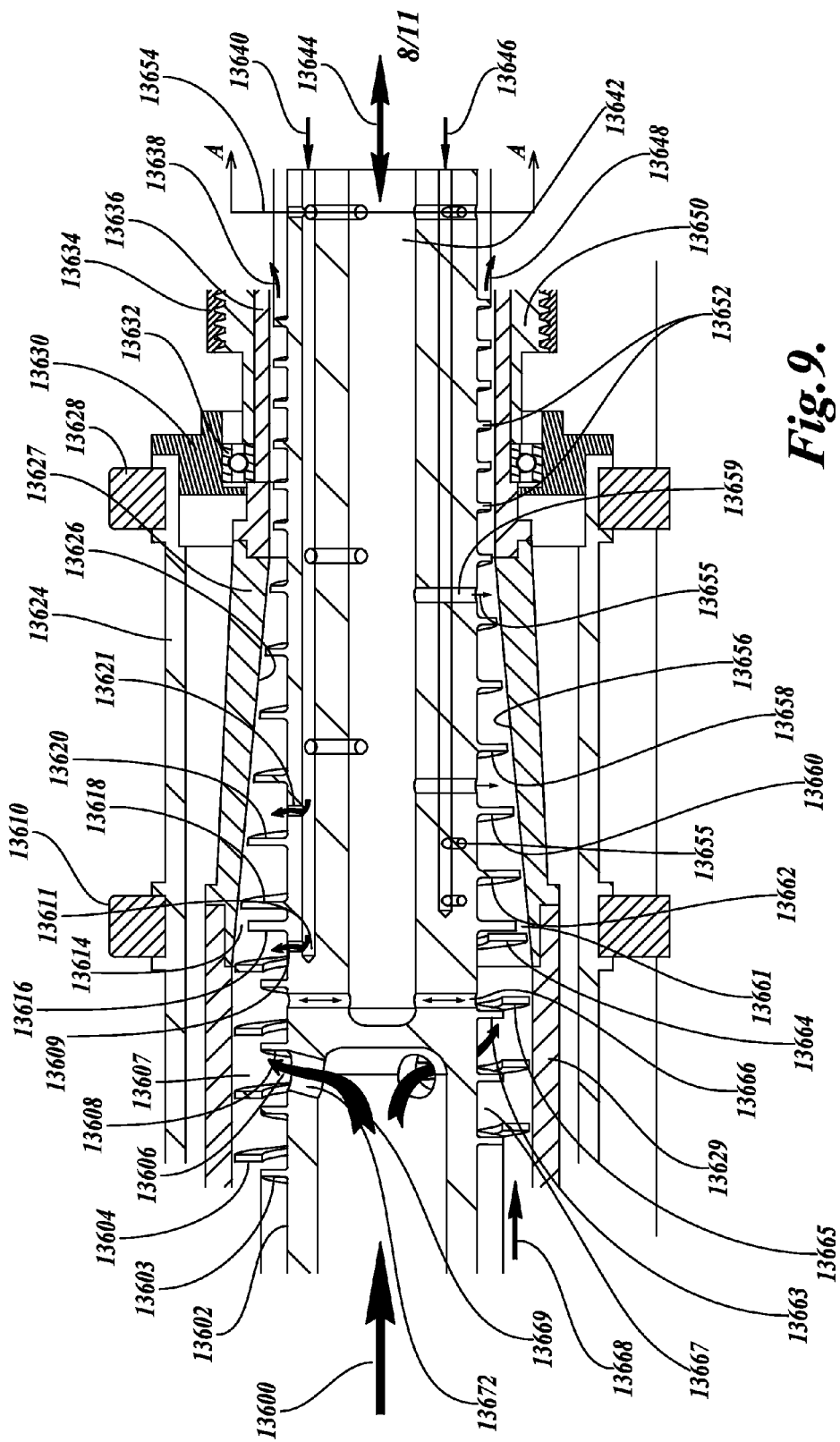
FIG. 9 is a diagrammatical illustration of a centrifuge for the separation of fat and lean.

Referring to FIG. 9, a section of a centrifuge is shown. The cross section shown in FIG. 9 is a segment including a section of the bowl 13629, which compares with the bowl 12420 as described in connection with FIG. 8 and a pulley 13650 with timing belt 13634, which compares with pulley 12398 and timing belt 12422 as shown in FIG. 8. A cross section "AA" through a vertical plane 13654 is shown in FIG. 9. The cross section shown in FIG. 9 is of a vertical plane passing through the centerline of cover 9016 shown in FIG. 5, which compares with cover 13624 in FIG. 9. A shaft 13602 with conduit enabling transfer of goods in the direction shown by arrow 13600 in FIG. 9 shows the termination of conduit 9064 shown in FIG. 5 where arrow 9009 can be compared with arrow 13600 pointing in the same direction. The segment of outer cover 13624 shown in FIG. 9 compares with an end section of cover 9016 closest to pulley cover 9052 in FIG. 5.

In this embodiment, a disc 13616 is fixed to central shaft 13602 at the inner region of tapering member 13627 with beech surface shown as 13626 and 13656. Member 13616 may be fixed to shaft 13602 in such a way to provide a peripheral gap shown as 13614 and 13661 in FIG. 9 with outer Archimedes screw with spiraling member shown as a series of members such as 13604, 13618, 13620, 13658, 13660, 13662, 13664, and 13665. Outer Archimedes screw extends in close proximity to beech surfaces 13656 and 13626 and following the inner surface of bowl 13629 then tapering member 13627, which connects with parallel sided conduit 13636 shown in FIG. 9. Archimedes screw members such as 13652 comprise segments of the outer Archimedes screw, which can facilitate the transfer of goods held in contact with the inner surface of bowl 13629 during normal operation of the centrifuge, represented in FIG. 9, after separation from goods transferred into spaces, such as 13667 and 13607, via conduit 13602, in the direction shown by arrows 13600, and through aperture 13672, in the direction shown by arrow 13669, and in such a way that the separated component, which in this instance can be lean particles, held by centrifugal force against the inner surfaces of bowl 13629 such that when central shaft 13602 rotates relative to outer bowl member 13629, the lean particles are transferred in the direction shown by arrow 13668 and through space 13661 or 13614, and then along the inner surfaces 13626 and 13656 of member 13627, and finally in the direction shown by arrows 13648 and 13638 after transfer by Archimedes screw members such as 13652. The centrifuge can be used to separate solids using a fluid, such as water, or compressed liquid carbon dioxide.

It may be desirable to elevate the density of the fluid by means other than elevating pressure with reduced temperature in the decanter style centrifuge as described herein, such that the centrifugal force applied thereto during the operation of the centrifuge, such that the fluid can be encouraged to transfer through spaces 13661 and 13614 in the opposite direction to the flow of the lean in the direction shown by arrow 13668. Sufficient fluid can be transferred so as to dilute and transfer residual salts held in solution contained within fluid in contact with the lean being transferred in the direction shown by arrow 13668 so as to dilute and/or remove a major proportion of the residual salts by continual washing under pressure of lean transferred through spaces shown as 13614 and 13661. Any combination of water and other additives can be transferred in the direction shown by arrows 13640 and 13646 and ultimately through such ports as 13621 on the upstream side of disc 13616 or alternatively on the downstream side of disc 13616 through port 13611 in the direction shown by arrow 13609.

The disclosed method may provide a means of not only obtaining the benefit of using the acidified sodium chlorite process of anti-microbial treatment but to also enable the substantial removal of residual acids and salts that would otherwise remain with the processed beef and through consumption. The cross section shown in FIG. 9 comprises an outer cover 13624 rigidly retained by brackets 13610 and 13628 with member 13630 clamped to outer cover 13624 and retaining bearing 13632 so as to enable the rotation of member 13636 driven by timing belt 13634. Bowl 13629 rigidly connecting to member 13627 and 13636 provides an enclosed and sealed conduit within which shaft 13602 and inner Archimedes screw 13603 and outer Archimedes screw 13604 comprising a single member that can be freely rotated at selected speeds within the outer conduit 13629, 13627 and 13636. A blend of ground beef and fluid is transferred in the direction shown by arrow 13600 and arrow 13669 through ports such as 13672 and into space 13607 and 13667. The inner Archimedes screw 13603 is provided to enable transfer of the fat particles in the opposite direction to arrow 13668 while the lean particles after separation can be transferred in the direction shown by arrow 13668 and ultimately through gap 13614 and 13661.

Figure 10:
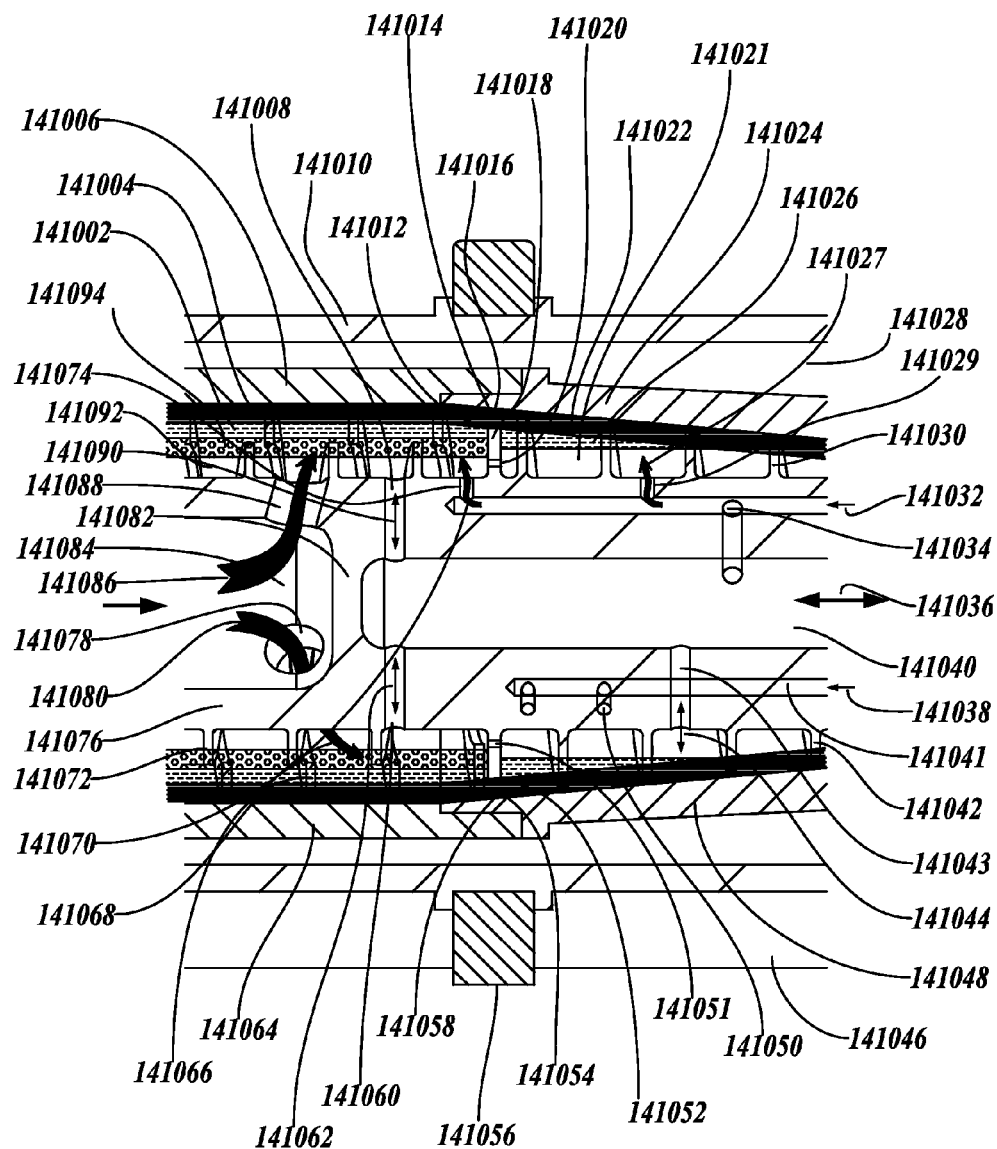
FIG. 10 is a diagrammatical illustration of a centrifuge for the separation of fat and lean.

Referring to FIG. 10, an enlarged view of the segment in the vicinity of rigid disc 141018, which is equivalent to 13616 in FIG. 9, is shown. A clamp 141056 rigidly retains outer cover 141010 by attachment to base 141046 wherein housing 141010 encloses space 141028 and bowl 141006 connected directly to tapering member 141048. Centrally disposed shaft 141076 is mounted within bowl 141006 such that the outer edges of Archimedes screw shown with members 141004, 141066, 141042 and 141030 are in close proximity to the inner surface of members 141064 and 141048. A gun drilled conduit 141084 enables controlled transfer of any selected blend of ground beef in the direction shown by arrows toward apertures 141088 and 141078 and there through as shown by arrows 141086 and 141080. Upon transfer there through and into space enclosed by bowl 141006, stratification occurs in a manner shown by outermost layer 141004 in contact with the inner surface of member 141006 representing the layer in which the most dense component of ground beef, i.e., lean particles, may stratify. The particles of fat 141094 stratifies at a layer between gas 141092 and fluid 141002. The fluid can stratify at layer 141002 between the outermost lean layer 141004 in contact with the inner surface of member 141006 and the lighter component of fat layer 141094 therefore stratifies as shown between the less dense gaseous layer 141092 and the more dense fluid layer 141002. It can be clearly seen therefore that inner Archimedes screw represented by member such as 141072 is arranged so as to transfer a fat layer in the opposite direction to the direction in which outer Archimedes screw represented by members such as 141066 can transfer lean in layer 141004 in the opposite direction toward tapering member 141024. Members 141006 and 141024 also shown as 141064 and 141048 are rigidly attached together and can be rotated at a controlled speed such as 700 rpm and the inner assembly comprising two concentric Archimedes screws arranged about a central shaft 141076 can be rotated at a controlled speed such as 790 rpm. The differential between the speed of the outer rotating member at 700 rpm and the inner rotating member at 790 rpm is therefore 90 rpm. The ratio between the inner assembly comprising shaft 141076 and outer member comprising 141006 can be increased and decreased according to needs. Both components can rotate so as to enable the clean separation in stratified layers as described above without applying too much load. A substantially circular disc 141018 is rigidly fixed to central shaft member 141076 so as to provide space 141054 shown between outer rim 141052 and location 141058 of member 141048 and space 141014 shown between outer rim 141012 of member 141018 and location 141016 of member 141024. The gap shown as 141014 and 141054 can be adjusted by interchanging discs 141018. However, once an optimized disc has been identified it should be unnecessary to adjust for like materials processed within the centrifuge segment.

As has been described above, it may be desirable to increase the density of the fluid shown in layer 141002 so as to enhance the separation of fatty material stratified in layer 141094, and this can be achieved by adding water alone having a specific gravity of one (1) or, alternatively, a salt solution such as sodium chlorite and water or any other salt. With sodium chlorite, the additional benefit of providing an anti-microbial treatment known as acidified sodium chlorite can be provided in such an instance. With the transfer of lean through gap 141014 and 141054, a quantity of acidified sodium chlorite can be carried therewith. It can be undesirable to allow this and certainly more preferable to eliminate a major portion of the residual salts retained after such treatment and therefore by providing controlled quantities of fresh water in the direction shown by arrow 141032 and 141038 and into space such as 141021 through port 141029 in the direction shown by arrow 141027, the concentration of residual spent salts can be at least diluted and even largely eliminated by allowing a quantity of such fresh fluid to accumulate in space 141026. Furthermore, holes such as 141051 and 141020 can be provided in circular disc 141018 to allow excess fluid to pass therethrough thereby diluting the fluid in the region closest to the disc 141018. Temperature and pressure controlled gas can also be transferred through conduit 141040 into space such as 141092 through ports such as 141008 and 141060, also diluting the amount of residual salts in the region having close proximity to the ports 141074 and 141060. Gas can also enhance and facilitate the improved transfer of fat in the direction away from disc 141018 by rotating inner Archimedes screw shown by member such as 141072.

It should be noted that pure or substantially pure clean temperature controlled water may be used as the sole fluid in the separation of lean from fat comprising ground beef. This can be achieved by blending a suitable quantity of water with ground beef in a suitable centrifuge such as the decanter style centrifuge apparatus. When used in this manner, the layers shown as 141004, 141002, 141094, and 141092 may comprise an outer layer of accumulated particles that are predominantly lean, layer 141004. A layer of water is at 141002. The layer of accumulated particles that are predominantly fat stratify at layer 141094.

In the case of water, the exposure of ground beef to the water can be kept short, such that the process can be performed such that the separation occurs in a short period of time such as not more than a few minutes, for example, 3-5 minutes may not be exceeded. Any residual water that may be transferred with the lean particles through space 141014 and 141054 can be minimized and this can be achieved by providing sufficiently ample quantities of fluid in space such as 141021 and 141026 after transfer through ports such as 141050 and 141027 and 141074 in the direction shown by arrow 141070. When water is to be used as the primary separation fluid, a proportion of approximately 50% water and 50% ground beef can be used, however, this ratio can be adjusted as required and under certain conditions it may be preferable to reduce the quantity of water when compared to the quantity of ground beef such as a ratio of one part water to two parts ground beef.

Figure 11:
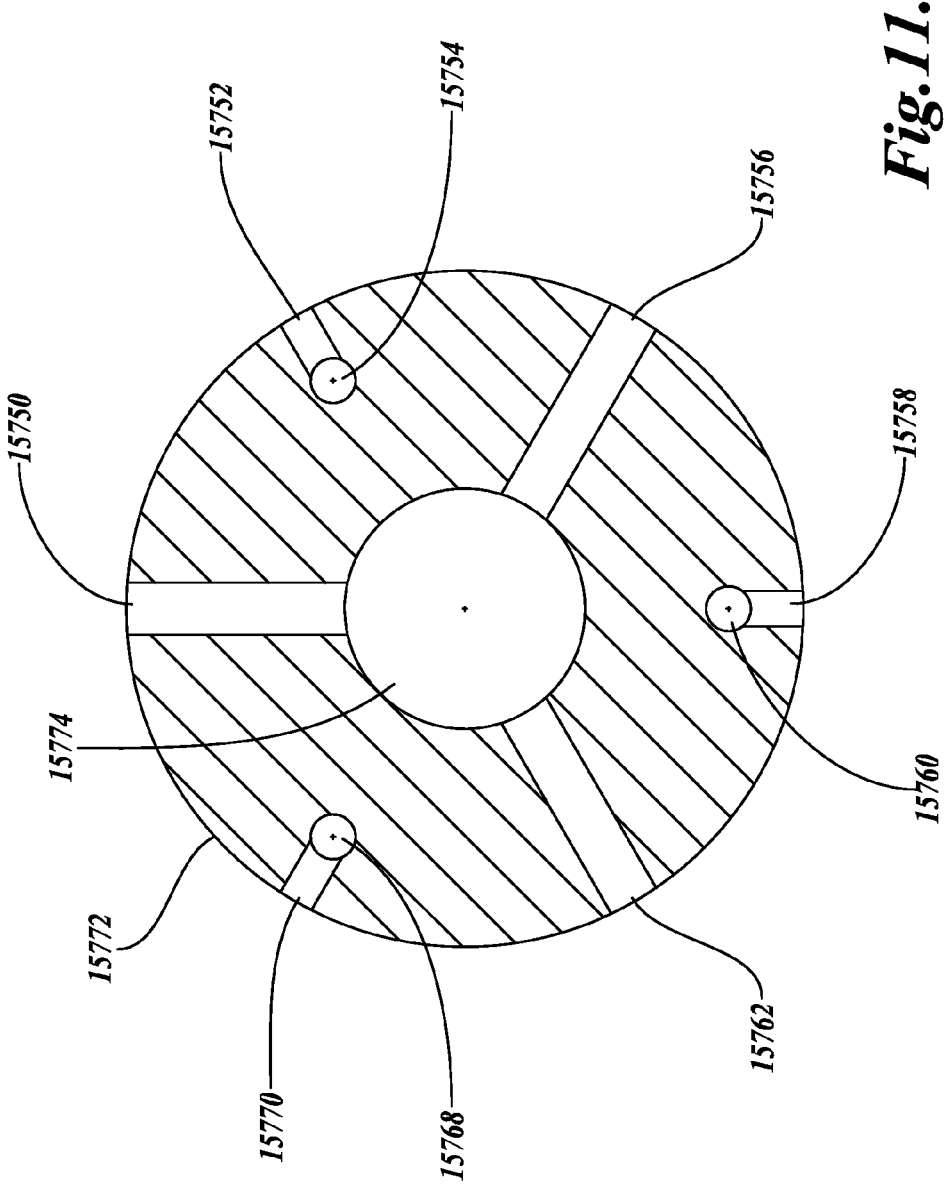
FIG. 11 is a diagrammatical illustration of a component of a centrifuge for the separation of fat and lean.

Referring to FIG. 11, a cross section through shaft 13602 of FIG. 9 is shown. The outer circumference of shaft 13602 at the cross section "AA" shown in FIG. 9 is represented by circular profile 15772 in FIG. 11. Conduit 15774 is centrally disposed as shown in FIG. 9 through which gas can be transferred in or out in the direction shown by double headed arrow 13644. Radially drilled ports 15750, 15756 and 15762 as shown in FIG. 11 correspond with ports 13659 shown in FIG. 9 and gas can be transferred through the ports in the direction shown, for example, by arrow 13655 in FIG. 9. Drilled holes 15768, 15754, and 15760, shown in FIG. 11, correspond with conduit such as shown in FIG. 9 as 13611 with arrows such as 13609 and 13621 indicating the direction of flow of any fluid after transfer through conduit such as 13611, can be transferred through radially drilled ports shown as 15770, 15752, and 15758 in FIG. 11 in the direction shown by arrows 13621 and 13609 in FIG. 9.

Figure 12:
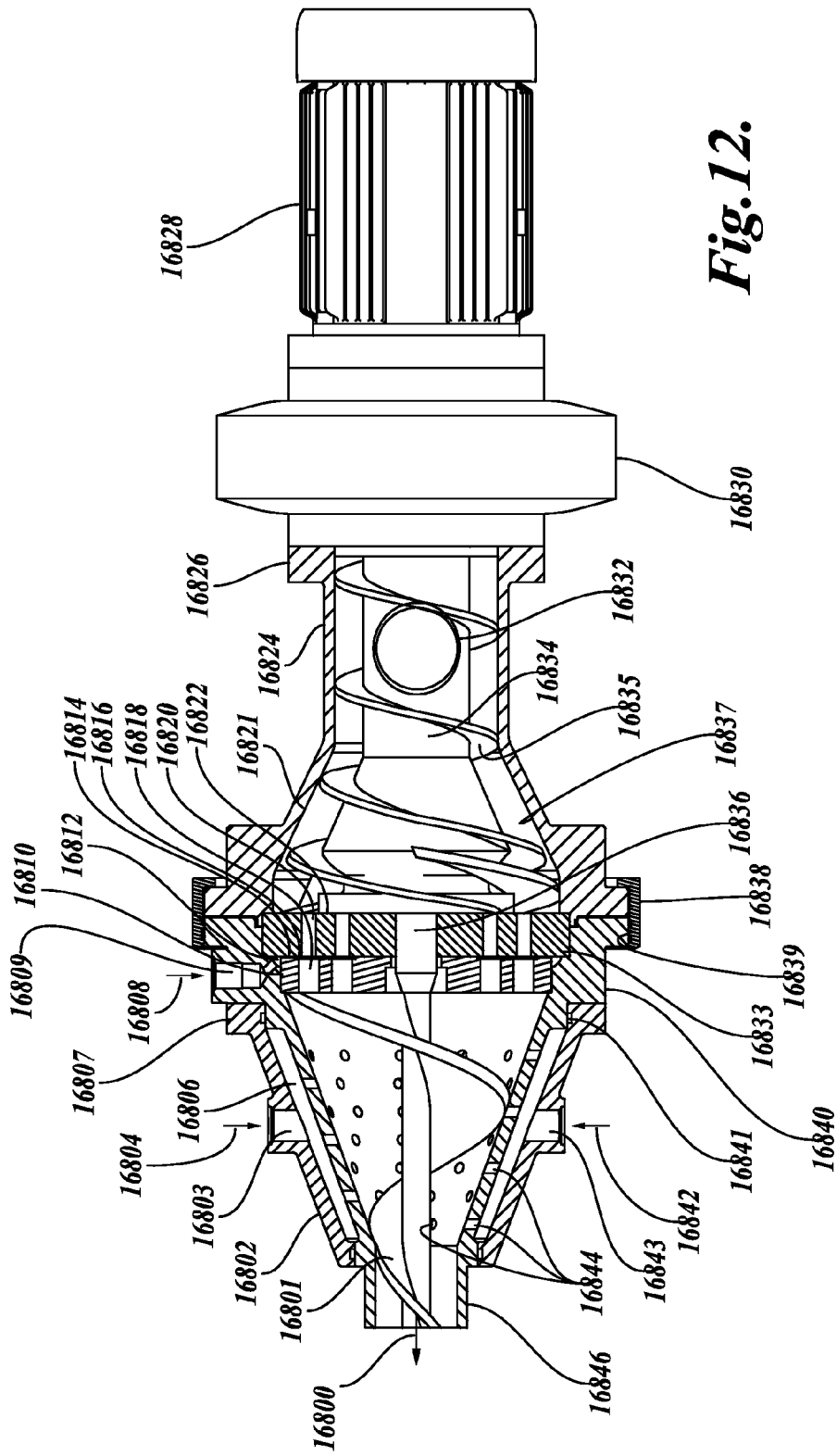
FIG. 12 is a diagrammatical illustration of a grinder.

Referring to FIG. 12, a side elevation of an apparatus intended for the continuous grinding of any goods, such as boneless beef or any other meat, is shown with a section cross-sectioned to assist in thorough disclosure thereof. The apparatus is intended to provide a continuous blended stream of ground beef blended with fluids to improve performance of the centrifuge. Conduit section 16846 shown in FIG. 12 would be arranged to connect directly to, with or without sealed bearings as may be required, to centrally disposed shaft 9011 with conduit 9064 there through as shown in FIG. 5 and as shown as 10200 in FIG. 6 with ground and blended goods being transferred directly from the apparatus shown in FIG. 12 to the apparatus shown in FIGS. 5 and 6. Said conduit 9011 in FIG. 5, 10200 in FIG.

6, corresponds with conduit 12383 shown in cross-sectional view in FIG. 8, 11350 in FIG. 7, corresponding with 11382 in FIG. 7 and conduit cross section 141084 as shown in FIG. 10. Arrow 16800 shown in FIG. 12 corresponds with arrow 13600 in FIG. 9, arrow 11349 in FIG. 7, and arrow 10119 in FIG. 6.

The apparatus shown in FIG. 12 is constructed of suitable materials, such as stainless steel and plastic materials where appropriate, with rubberized gaskets where required to provide seals. Boneless beef transferred via a port shown as 16832 in FIG. 12 is transferred under pressure by Archimedes screw 16834 through grind plate 16833 such as through grind plate aperture 16820 into aperture 16818 in plate 16810 and after blending with fluids, transferred into mixing chamber within which Archimedes screw 16801 is mounted and then via conduit 16846 in the direction shown as arrow 16800 into the centrifuge equipment as described in connection with FIGS. 5 through 11.

A variable speed electric motor 16828 is connected directly to a gear reducer 16830 of selected ratio, which in turn is connected to Archimedes screw member 16834. Variable speed electric motor 16828 can be adjusted by varying the electric current supplied thereto so as to vary the speed at which screw 16834 rotates thereby enabling a variable control of the mass flow of goods being transferred under pressure through port 16832 then driven by screw 16834 through grind plate 16833. The rotational speed of screw 16832 can be varied so as to adjust the mass flow of boneless beef through the grinding mechanism comprising a knife rotating with the screw against the surface of grind plate 16833 facing toward the screw and by varying the speed at which screw 16834 rotates, the knives attached thereto facilitating the cutting of beef transferred through apertures such as 16820 according to rotational speed.

Boneless beef pumped through aperture 16832 and driven by screw 16834 is transferred through apertures in grind plate 16833 such as aperture 16820 at a mass flow rate controlled by the speed of variable speed electric motor 16828. Therefore, the increased rate of mass flow of beef through the grind plate is directly determined by the speed at which variable speed electric motor 16828 is driven. By increasing the rotational speed of screw 16834, boneless beef transferred through the grind plate increases correspondingly.

Planetary gear reducer 16830 is attached to housing 16824 at flange 16826. An internally threaded nut 16838 matches with external thread at 16839 of member 16840 such that when nut 16838 is tightened, segment 16854 of housing 16824 is compressed against corresponding face of member 16840 adjacent to threaded section 16839. Grinding plate 16833 is clamped between member 16840 and housing 16824 so as to hold in place with a suitable compression. Grinding holes such as 16820 in grind plate 16833 are arranged to correspond with and locate centrally with an equal number of holes such as 16818 drilled in matching plate 16810, which is clamped in place by a shoulder machined in member 16840, which compresses and holds plate 16810 firmly against corresponding face of grind plate 16833. Apertures 16818 are drilled with larger diameter than the diameter of grinding holes such as 16820 in grind plate 16833.

The purpose of this is to allow the free transfer of ground beef from grind apertures, such as 16820 and through adjacent apertures, such as 16818 in such a manner that there is no restriction inhibiting the transfer of ground beef through second plate 16810. Grind plate 16833 can be considered as a first plate and plate 16810 a second plate with grind holes such as 16820 corresponding with clearance holes in the second plate 16818. A series of recesses, such as 16814 and 16816, are machined in the face of second plate 16810 between the first plate and the second plate so as to provide a communication channel between holes drilled in the first and second plates. The recesses 16814 and 16816 are connected via annular passageway 16812, which is machined around the internal periphery of member 16840 at the location between the first and second plate. Annular aperture 16812 is in direct communication through a series of drilled ports and conduits with port 16809 and all such recesses and ports machined in connection with clearance holes such as 16818, end plate 16810 are in direct communication so as to allow any fluid to be transferred into port 16809 in the direction shown by arrow 16808 to emerge around the periphery of said holes such as 16818 in plate 16810 between plate 16810 and first grind plate 16833.

In this way, the fluid transferred in the direction shown by arrow 16808 through port 16809 may emerge into holes such as 16818 in plate 16810 so as to cover the full circumferential surfaces of all cylindrical profile ground beef transferred through the holes such as 16818 in plate 16810. In this way, ground beef processed by transfer through holes such as 16820 in plate 16833 is fully immersed in fresh fluid transferred under pressure through the holes such as 16818 in plate 16810 when ground beef is transferred directly into adjacent holes such as 16818 in second plate 16810 from grind plate 16833, grinding holes 16820.

Particles of ground beef, wherein such particles include particles that are predominantly lean and particles that are predominantly fat, are transferred at a mass flow rate determined by the pressure of goods transferred through aperture 16832 and also the rotational speed of the screw 16834 driven by variable speed motor 16828. Furthermore, the particle size is also determined by the rotational speed of screw 16834 in combination with the mass flow rate pressurized and transferred through inlet port 16832. Port 16832 is connected directly with a high pressure positive displacement pump and the knives attached to screw 16834 in contact with face 16822 of grind plate 16833.

By increasing the rotational speed of screw 16834 and reducing the mass flow of boneless beef through port 16832, the cut size of the particles can be reduced. Alternatively by increasing the mass flow of boneless beef through port 16832 and reducing the rotational speed of screw 16834, the particle size of ground beef can be increased. The particle size of ground beef may affect the effectiveness of fat separated from lean in the centrifuge. By reducing the particle size, the proportion of fat separated from lean can be increased. Conversely, by increasing the size, less fat may separate from lean. Therefore, by adjusting the particle size, a specified grade of ground beef having a selected fat content can be produced. In this way, any selected fat content ground beef can be produced by varying the mass flow of boneless beef through aperture 16832 in combination with the rotational speed of variable speed electric motor 16828.

Reclaimed fluid from the centrifuge separated by extraction through ports shown as 11374 in FIG. 11, and others, and subsequently through manifold 11422 can be recycled by control of mass flow through ports 16803 and 16843 in the direction shown by arrows 16804 and 16842. An outer member 16802 is fitted around member 16840 to provide annular cone shaped manifold space 16806. Said space 16806 is in direct communication with a series of holes such as 16844 drilled in member 16840. It can therefore be seen that with the apparatus herein disclosed and described in association with FIG. 12, ground beef can be blended continuously and according to a selected proportion with fluids transferred via ports 16803 in the direction shown by arrow 16804, port 16809 in the direction shown by arrow 16808 and into port 16803 in the direction shown by arrow 16842. Screw 16801 provided with a pitch approximately twice the pitch of screw 16834 is provided to ensure that consistent mass flow of blended ground beef and specified fluids transferred, ultimately through conduit 16846 in the direction shown by arrow 16800, are consistently blended on a continuous basis.

Embodiments include, but, are not limited to the following. Any one, more than one, or all of the features can be combined.

A method for separating fat from lean includes, grinding chilled beef comprising fat and lean into a size resulting in particles that comprise predominantly fat and particles that comprise predominantly lean; combining the particles with a fluid to produce a mixture, wherein the fluid comprises water; and centrifuging the mixture to separate the fluid, and the particles comprising predominantly lean from the mixture.

The method may further include collecting the fluid, and introducing the collected fluid into the mixture prior to centrifuging. The fluid may include an acid. The acid may be carbonic acid. The fluid comprises chlorine dioxide. The particle size may be in a range of 1/16 to 1/4. The method may further include separating the particles comprising predominantly fat. The beef may be chilled prior to grinding.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for separating fat from lean, comprising:
    selecting a fat content of beef to be produced;
    chilling beef comprising fat and lean;
    reducing the chilled beef into particles that comprise fat and particles that comprise lean, wherein a size of the lean particles is selected to result in a proportion of fat about the same as the selected fat content of beef to be produced;
    combining the particles with a fluid to produce a mixture, wherein the fluid comprises water; and
    centrifuging the mixture to separate the fluid from the particles that comprise lean; and
    collecting the lean particles to produce the beef having the selected fat content.

2. The method of claim 1, further comprising collecting the fluid, and introducing the collected fluid into the mixture prior to centrifuging.

3. The method of claim 1, wherein the fluid comprises an acid.

4. The method of claim 3, wherein the acid is carbonic acid.

5. The method of claim 1, wherein the fluid comprises sodium citrate, sodium chlorite, tri-sodium phosphate and/or sodium chloride or any combination thereof.

6. The method of claim 1, wherein the particles are sized less than one-half inch.

7. The method of claim 1, wherein the particle size is increased or decreased by varying a flow of the beef.

8. The method of claim 1, wherein a particle size is increased or decreased by varying a speed of a variable speed motor connected to a grinder.

9. The method of claim 1, wherein gas accumulates in a center of the centrifuge.

* * * * *